(12) United States Patent
Swafford, Jr. et al.

(10) Patent No.: US 10,535,216 B2
(45) Date of Patent: Jan. 14, 2020

(54) SYSTEM FOR INVENTORY MANAGEMENT

(71) Applicant: RTC Industries, Inc., Rolling Meadows, IL (US)

(72) Inventors: John Wesley Swafford, Jr., Palatine, IL (US); Michael Alvin Lembke, Roselle, IL (US)

(73) Assignee: RTC Industries, Inc., Rolling Meadows, IL (US)

( * ) Notice: Subject to any disclaimer, the term of this patent is extended or adjusted under 35 U.S.C. 154(b) by 205 days.

(21) Appl. No.: 15/794,985

(22) Filed: Oct. 26, 2017

(65) Prior Publication Data

US 2018/0047243 A1 Feb. 15, 2018

Related U.S. Application Data

(60) Division of application No. 14/308,989, filed on Jun. 19, 2014, now Pat. No. 9,805,539, which is a division
(Continued)

(51) Int. Cl.
*G06Q 10/08* (2012.01)
*G07F 11/38* (2006.01)
(Continued)

(52) U.S. Cl.
CPC .............. *G07F 11/38* (2013.01); *A47F 1/126* (2013.01); *G06Q 10/087* (2013.01); *G07F 9/026* (2013.01);
(Continued)

(58) Field of Classification Search
CPC ...................................................... G06Q 10/08
(Continued)

(56) References Cited

U.S. PATENT DOCUMENTS 154,940 A 9/1874 Adams
355,511 A 1/1887 Danner
(Continued)

FOREIGN PATENT DOCUMENTS

AU 2007233199 A1 10/2007
BE 906083 A2 4/1987
(Continued)

OTHER PUBLICATIONS

Apr. 6, 2018—(KR) Office Action—App 10-2017-7015819.
(Continued)

*Primary Examiner* — Russell S Glass
(74) *Attorney, Agent, or Firm* — Banner & Witcoff, Ltd.

(57) ABSTRACT

The present invention relates to a system for detecting and communicating the position of a pusher assembly on a shelf. In an embodiment, a system includes a control module, a pusher assembly, and a laser scanner. The laser scanner is configured to transmit a swept beam to a mirrored reflective surface located behind the pusher assembly. The control module analyzes the laser beam at the laser scanner to detect the position of the pusher assembly on the shelf. In another embodiment, a system includes a control module, a pusher assembly, and an infrared transceiver that sends and receives infrared signals. The transceiver may be located behind the pusher assembly. The control module analyzes the infrared signals to determine the position of the pusher assembly on the shelf.

20 Claims, 23 Drawing Sheets

Related U.S. Application Data of application No. 13/194,649, filed on Jul. 29, 2011, now Pat. No. 8,812,378, which is a continuation of application No. 12/876,919, filed on Sep. 7, 2010, now Pat. No. 8,938,396, which is a continuation-in-part of application No. 10/772,010, filed on Feb. 3, 2004, now Pat. No. 7,792,711.

(60) Provisional application No. 61/371,417, filed on Aug. 6, 2010.

(51) Int. Cl.
*G07F 9/02* (2006.01)
*G07F 11/36* (2006.01)
*G07F 11/42* (2006.01)
*G08B 13/196* (2006.01)
*A47F 1/12* (2006.01)

(52) U.S. Cl.
CPC ............. *G07F 11/36* (2013.01); *G07F 11/42* (2013.01); *G08B 13/19697* (2013.01)

(58) Field of Classification Search
USPC .......................................................... 705/28
See application file for complete search history.

(56) References Cited

U.S. PATENT DOCUMENTS

| | | | |
|---|---|---|---|
| 632,231 A | 12/1905 | Blades |
| 808,067 A | 12/1905 | Briggs |
| 847,863 A | 3/1907 | Watts |
| 1,156,140 A | 10/1915 | Hair |
| 1,682,580 A | 8/1928 | Pratt |
| 1,703,987 A | 3/1929 | Butler |
| 1,712,080 A | 5/1929 | Kelly |
| 1,714,266 A | 5/1929 | Johnson |
| 1,734,031 A | 11/1929 | Carlston |
| 1,786,392 A | 12/1930 | Kemp |
| 1,964,597 A | 6/1934 | Rapellin |
| 1,971,749 A | 8/1934 | Hamilton |
| 1,991,102 A | 2/1935 | Kernaghan |
| 2,057,627 A | 10/1936 | Ferris |
| 2,079,754 A | 5/1937 | Waxgiser |
| 2,085,479 A | 6/1937 | Shaffer et al. |
| 2,110,299 A | 3/1938 | Hinkle |
| 2,111,496 A | 3/1938 | Scriba |
| 2,129,122 A | 9/1938 | Follett |
| 2,185,605 A | 1/1940 | Murphy |
| 2,218,444 A | 10/1940 | Vineyard |
| 2,499,088 A | 2/1950 | Brill |
| 2,516,122 A | 7/1950 | Hughes |
| 2,538,165 A | 1/1951 | Randtke |
| 2,555,102 A | 5/1951 | Anderson |
| 2,563,570 A | 8/1951 | Williams |
| 2,652,154 A | 9/1953 | Stevens |
| 2,670,853 A | 3/1954 | Schneider |
| 2,678,045 A | 5/1954 | Erhard |
| 2,732,952 A | 1/1956 | Skelton |
| 2,738,881 A | 3/1956 | Michel |
| 2,750,049 A | 6/1956 | Hunter |
| 2,775,365 A | 12/1956 | Mestman |
| 2,893,596 A | 7/1959 | Gabrielsen |
| 2,918,295 A | 12/1959 | Milner |
| 2,934,212 A | 4/1960 | Jacobson |
| 2,948,403 A | 8/1960 | Vallez |
| 2,964,154 A | 12/1960 | Erickson |
| 3,083,067 A | 3/1963 | Vos et al. |
| 3,103,396 A | 9/1963 | Portnoy |
| 3,151,576 A | 10/1964 | Patterson |
| 3,161,295 A | 12/1964 | Chesley |
| 3,166,195 A | 1/1965 | Taber |
| 3,285,429 A | 11/1966 | Propst |
| 3,308,961 A | 3/1967 | Chesley |
| 3,308,964 A | 3/1967 | Pistone |
| 3,348,732 A | 10/1967 | Shwarz |
| 3,405,716 A | 10/1968 | Cafiero |
| 3,452,899 A | 7/1969 | Libberton |
| 3,497,081 A | 2/1970 | Field |
| 3,501,020 A | 3/1970 | Krikorian |
| D219,058 S | 10/1970 | Kaczur |
| 3,550,979 A | 12/1970 | Protzmann |
| 3,598,246 A | 8/1971 | Galli |
| 3,652,154 A | 3/1972 | Gebel |
| 3,667,826 A | 6/1972 | Wood |
| 3,698,568 A | 10/1972 | Armstrong |
| 3,709,371 A | 1/1973 | Luck |
| 3,724,715 A | 4/1973 | Auriemma |
| 3,751,129 A | 8/1973 | Wright et al. |
| 3,767,083 A | 10/1973 | Webb |
| 3,814,490 A | 6/1974 | Dean et al. |
| 3,815,519 A | 6/1974 | Meyer |
| 3,830,169 A | 8/1974 | Madey |
| 3,848,745 A | 11/1974 | Smith |
| 3,868,021 A | 2/1975 | Heinrich |
| 3,870,156 A | 3/1975 | O'Neill |
| 4,007,841 A | 2/1977 | Seipel |
| 4,042,096 A | 8/1977 | Smith |
| 4,106,668 A | 8/1978 | Gebhardt et al. |
| 4,269,326 A | 5/1981 | Delbrouck |
| 4,300,693 A | 11/1981 | Spamer |
| 4,303,162 A | 12/1981 | Suttles |
| 4,314,700 A | 2/1982 | Dylag |
| 4,331,243 A | 5/1982 | Doll |
| 4,351,439 A | 9/1982 | Taylor |
| 4,378,872 A | 4/1983 | Brown |
| 4,448,653 A | 5/1984 | Wegmann |
| 4,454,948 A | 6/1984 | Spamer |
| 4,460,096 A | 7/1984 | Ricci |
| 4,463,854 A | 8/1984 | MacKenzie |
| 4,467,927 A | 8/1984 | Nathan |
| 4,476,985 A | 10/1984 | Norberg et al. |
| 4,482,066 A | 11/1984 | Dykstra |
| 4,488,653 A | 12/1984 | Belokin |
| 4,504,100 A | 3/1985 | Chaumard |
| 4,588,093 A | 5/1986 | Field |
| 4,589,349 A | 5/1986 | Gebhardt et al. |
| 4,602,560 A | 7/1986 | Jacky |
| 4,615,276 A | 10/1986 | Garabedian |
| 4,620,489 A | 11/1986 | Albano |
| 4,629,072 A | 12/1986 | Loew |
| 4,651,883 A | 3/1987 | Gullett et al. |
| 4,685,574 A | 8/1987 | Young et al. |
| 4,705,175 A | 11/1987 | Howard et al. |
| 4,706,821 A | 11/1987 | Kohls et al. |
| 4,724,968 A | 2/1988 | Wombacher |
| 4,729,481 A | 3/1988 | Hawkinson et al. |
| 4,730,741 A | 3/1988 | Jackle, III et al. |
| 4,742,936 A | 5/1988 | Rein |
| 4,762,235 A | 8/1988 | Howard et al. |
| 4,762,236 A | 8/1988 | Jackle, III et al. |
| 4,768,661 A | 9/1988 | Pfeifer |
| 4,775,058 A | 10/1988 | Yatsko |
| 4,776,472 A | 10/1988 | Rosen |
| 4,790,037 A | 12/1988 | Phillips |
| 4,809,856 A | 3/1989 | Muth |
| 4,828,144 A | 5/1989 | Garrick |
| 4,830,201 A | 5/1989 | Breslow |
| 4,836,390 A | 6/1989 | Polvere |
| 4,846,367 A | 7/1989 | Guigan et al. |
| 4,883,169 A | 11/1989 | Flanagan, Jr. |
| 4,899,668 A | 2/1990 | Valiulis |
| 4,901,853 A | 2/1990 | Maryatt |
| 4,901,869 A | 2/1990 | Hawkinson et al. |
| 4,907,707 A | 3/1990 | Crum |
| 4,934,645 A | 6/1990 | Breslow |
| 4,954,697 A | 9/1990 | Kokubun et al. |
| 5,009,334 A | 4/1991 | Bodkins |
| 5,012,936 A | 5/1991 | Crum |
| 5,025,936 A | 6/1991 | Lamoureaux |
| 5,027,957 A | 7/1991 | Skalski |
| 5,082,125 A | 1/1992 | Ninni |
| 5,088,607 A | 2/1992 | Risafi et al. |
| 5,110,192 A | 5/1992 | Lauterbach |

(56) References Cited

U.S. PATENT DOCUMENTS

| | | |
|---|---|---|
| 5,111,942 A | 5/1992 | Bernardin |
| 5,123,546 A | 6/1992 | Crum |
| 5,148,927 A | 9/1992 | Gebka |
| 5,161,702 A | 11/1992 | Skalski |
| 5,172,314 A | 12/1992 | Poland et al. |
| 5,178,258 A | 1/1993 | Smalley et al. |
| 5,183,166 A | 2/1993 | Belokin, Jr. et al. |
| 5,190,186 A | 3/1993 | Yablans et al. |
| 5,203,463 A | 4/1993 | Gold |
| 5,215,199 A | 6/1993 | Bejarano |
| 5,240,126 A | 8/1993 | Foster et al. |
| 5,255,802 A | 10/1993 | Krinke et al. |
| 5,257,090 A | 10/1993 | Meinzer et al. |
| 5,265,738 A | 11/1993 | Yablans et al. |
| 5,316,154 A | 5/1994 | Hajec, Jr. |
| 5,341,945 A | 8/1994 | Gibson |
| 5,351,839 A | 10/1994 | Beeler et al. |
| 5,366,099 A | 11/1994 | Schmid |
| 5,381,908 A | 1/1995 | Klepp |
| 5,390,802 A | 2/1995 | Pappagallo et al. |
| 5,413,229 A | 5/1995 | Zuberbuhler et al. |
| 5,415,297 A | 5/1995 | Klein et al. |
| 5,448,226 A | 9/1995 | Failing, Jr. et al. |
| 5,450,969 A | 9/1995 | Johnson et al. |
| 5,458,248 A | 10/1995 | Alain |
| 5,464,105 A | 11/1995 | Mandeltort |
| 5,469,975 A | 11/1995 | Fajnsztajn |
| 5,469,976 A | 11/1995 | Burchell |
| 5,537,312 A | 7/1996 | Sekiguchi et al. |
| 5,542,552 A | 8/1996 | Yablans et al. |
| 5,548,282 A | 8/1996 | Escritt et al. |
| 5,562,217 A | 10/1996 | Salveson et al. |
| 5,613,621 A | 3/1997 | Gervasi et al. |
| D378,888 S | 4/1997 | Bertilsson |
| 5,615,780 A | 4/1997 | Nimetz et al. |
| 5,634,564 A | 6/1997 | Spamer et al. |
| 5,638,963 A | 6/1997 | Finnelly et al. |
| 5,665,304 A | 9/1997 | Heinen et al. |
| 5,671,362 A * | 9/1997 | Cowe ............... G06Q 10/087 |
| | | 340/5.92 |
| 5,671,851 A | 9/1997 | Johnson et al. |
| 5,673,801 A | 10/1997 | Markson |
| D386,363 S | 11/1997 | Dardashti |
| 5,685,664 A | 11/1997 | Parham et al. |
| 5,730,320 A | 3/1998 | David |
| 5,737,504 A | 4/1998 | Yamada |
| 5,738,019 A | 4/1998 | Parker |
| 5,740,944 A | 4/1998 | Crawford |
| 5,743,428 A | 4/1998 | Rankin, VI |
| 5,746,328 A | 5/1998 | Beeler et al. |
| 5,788,090 A | 8/1998 | Kajiwara |
| 5,803,276 A | 9/1998 | Vogler |
| 5,826,731 A | 10/1998 | Dardashti |
| 5,839,588 A | 11/1998 | Hawkinson |
| 5,855,283 A | 1/1999 | Johnson |
| 5,859,414 A | 1/1999 | Grimes et al. |
| 5,873,473 A | 2/1999 | Pater |
| 5,878,895 A | 3/1999 | Springs |
| 5,880,449 A | 3/1999 | Teicher et al. |
| 5,906,283 A | 5/1999 | Kump et al. |
| 5,933,813 A | 8/1999 | Teicher et al. |
| 5,963,134 A | 10/1999 | Bowers et al. |
| 5,971,204 A | 10/1999 | Apps |
| 5,992,652 A | 11/1999 | Springs |
| 5,992,653 A | 11/1999 | Anderson et al. |
| 6,006,678 A | 12/1999 | Merit et al. |
| 6,041,720 A | 3/2000 | Hardy |
| 6,076,670 A | 6/2000 | Yeranossian |
| 6,082,557 A | 7/2000 | Leahy |
| 6,082,558 A | 7/2000 | Battaglia |
| 6,089,385 A | 7/2000 | Nozawa |
| 6,105,004 A | 8/2000 | Halperin et al. |
| 6,105,791 A | 8/2000 | Chalson et al. |
| 6,112,938 A | 9/2000 | Apps |
| 6,129,218 A | 10/2000 | Henry et al. |
| 6,142,317 A | 11/2000 | Merl |
| 6,158,598 A | 12/2000 | Josefsson |
| 6,164,491 A | 12/2000 | Bustos et al. |
| 6,173,845 B1 | 1/2001 | Higgins et al. |
| 6,209,733 B1 | 4/2001 | Higgins et al. |
| 6,227,385 B1 | 5/2001 | Nickerson |
| 6,234,325 B1 | 5/2001 | Higgins et al. |
| 6,234,326 B1 | 5/2001 | Higgins et al. |
| 6,234,328 B1 | 5/2001 | Mason |
| 6,253,190 B1 | 6/2001 | Sutherland |
| D445,615 S | 7/2001 | Burke |
| 6,253,954 B1 | 7/2001 | Yasaka |
| 6,269,285 B1 * | 7/2001 | Mignault ............... A47F 1/06 |
| | | 206/745 |
| 6,289,326 B1 | 9/2001 | LaFleur |
| 6,357,606 B1 | 3/2002 | Henry |
| 6,378,727 B1 | 4/2002 | Dupuis et al. |
| 6,382,431 B1 | 5/2002 | Burke |
| 6,389,991 B1 | 5/2002 | Morrisson |
| 6,401,942 B1 | 6/2002 | Eckert |
| 6,405,880 B1 | 6/2002 | Webb |
| 6,409,026 B2 | 6/2002 | Watanabe |
| 6,409,027 B1 | 6/2002 | Chang et al. |
| 6,409,028 B2 | 6/2002 | Nickerson |
| 6,464,089 B1 | 10/2002 | Rankin, VI |
| 6,484,891 B2 | 11/2002 | Burke |
| 6,497,326 B1 | 12/2002 | Osawa |
| 6,497,367 B2 | 12/2002 | Conzola et al. |
| 6,507,352 B1 | 1/2003 | Cohen et al. |
| 6,523,664 B2 | 2/2003 | Shaw et al. |
| 6,523,703 B1 | 2/2003 | Robertson |
| 6,527,127 B2 | 3/2003 | Dumontet |
| 6,533,131 B2 | 3/2003 | Bada |
| 6,536,658 B1 | 3/2003 | Rantze |
| D472,411 S | 4/2003 | Burke |
| 6,550,674 B1 | 4/2003 | Neumark |
| 6,598,754 B2 | 7/2003 | Weiler |
| 6,622,874 B1 | 9/2003 | Hawkinson |
| 6,655,536 B2 | 12/2003 | Jo et al. |
| 6,666,533 B1 | 12/2003 | Stavros |
| D485,699 S | 1/2004 | Mueller et al. |
| 6,717,516 B2 | 4/2004 | Bridgelall |
| 6,738,628 B1 | 5/2004 | McCall et al. |
| 6,772,888 B2 | 8/2004 | Burke |
| 6,830,157 B2 | 12/2004 | Robertson et al. |
| 6,866,156 B2 | 3/2005 | Nagel et al. |
| 6,886,699 B2 | 5/2005 | Johnson et al. |
| 6,889,854 B2 | 5/2005 | Burke |
| 6,897,763 B2 | 5/2005 | Schulmerich et al. |
| 6,914,648 B2 | 7/2005 | Niiyama et al. |
| 6,948,900 B1 | 9/2005 | Neuman |
| 6,964,235 B2 | 11/2005 | Hardy |
| 7,002,451 B2 | 2/2006 | Freeman |
| 7,084,769 B2 | 8/2006 | Bauer et al. |
| 7,090,125 B2 | 8/2006 | Goel et al. |
| 7,093,546 B2 | 8/2006 | Hardy |
| 7,114,606 B2 | 10/2006 | Shaw et al. |
| 7,152,040 B1 | 12/2006 | Hawthorne et al. |
| 7,152,791 B2 | 12/2006 | Chappidi et al. |
| 7,155,238 B2 | 12/2006 | Katz |
| 7,216,770 B2 | 5/2007 | Mueller et al. |
| 7,252,230 B1 | 8/2007 | Sheikh et al. |
| 7,319,397 B2 | 1/2008 | Chung et al. |
| 7,400,251 B2 | 7/2008 | Czyszczewski et al. |
| 7,458,473 B1 | 12/2008 | Mason |
| 7,493,336 B2 | 2/2009 | Noonan |
| 7,520,429 B2 | 4/2009 | Koster |
| 7,526,762 B1 | 4/2009 | Astala et al. |
| 7,542,283 B1 | 6/2009 | Curran et al. |
| 7,565,108 B2 | 7/2009 | Kotola et al. |
| 7,580,845 B2 | 8/2009 | Burman et al. |
| 7,614,065 B2 | 11/2009 | Weissmueller, Jr. et al. |
| 7,641,057 B2 | 1/2010 | Mueller et al. |
| 7,675,422 B2 | 3/2010 | Stevens et al. |
| 7,686,185 B2 | 3/2010 | Zychinski |
| 7,743,984 B2 | 6/2010 | Olsen et al. |
| 7,775,130 B2 | 8/2010 | Harish et al. |
| 7,775,430 B2 | 8/2010 | Lin |
| 7,792,711 B2 | 9/2010 | Swafford, Jr. et al. |

(56) References Cited

U.S. PATENT DOCUMENTS

| | | |
|---|---|---|
| 7,815,060 B2 | 10/2010 | Iellimo |
| 7,823,734 B2 | 11/2010 | Hardy |
| 7,837,106 B2 | 11/2010 | Fabre et al. |
| 7,853,477 B2 | 12/2010 | O'Shea et al. |
| 7,864,041 B2 | 1/2011 | Godlewski |
| 7,896,172 B1 | 3/2011 | Hester |
| 7,904,333 B1 | 3/2011 | Perkowski |
| 7,982,622 B2 | 7/2011 | Burchell et al. |
| 8,089,357 B2 | 1/2012 | Irmscher et al. |
| 8,135,482 B2 | 3/2012 | Caldwell et al. |
| 8,144,245 B2 | 3/2012 | Vik |
| 8,171,142 B2 | 5/2012 | Kolin et al. |
| 8,184,005 B2 | 5/2012 | Kamel |
| 8,207,819 B2 | 6/2012 | Bonner et al. |
| 8,219,558 B1 | 7/2012 | Trandal et al. |
| 8,231,017 B2 | 7/2012 | Clontz et al. |
| 8,255,500 B2 | 8/2012 | Cacheria, III et al. |
| 8,280,784 B2 | 10/2012 | Hurtis et al. |
| 8,284,059 B2 | 10/2012 | Ross |
| 8,284,061 B1 | 10/2012 | Dione |
| 8,312,999 B2 | 11/2012 | Hardy |
| 8,321,302 B2 | 11/2012 | Bauer et al. |
| 8,322,544 B2 | 12/2012 | Hardy |
| 8,342,340 B2 | 1/2013 | Ratajczak, III et al. |
| 8,376,154 B2 | 2/2013 | Sun |
| 8,410,931 B2 | 4/2013 | Petite et al. |
| 8,463,431 B2 | 6/2013 | Segal et al. |
| 8,489,452 B1 | 7/2013 | Warner et al. |
| 8,629,772 B2 | 1/2014 | Valiulis et al. |
| 8,662,325 B2 | 3/2014 | Davis et al. |
| 8,698,606 B2 | 4/2014 | Choi et al. |
| 8,739,984 B2 | 6/2014 | Hardy |
| 8,751,318 B2 | 6/2014 | Kim et al. |
| 8,781,622 B2 | 7/2014 | Mockus et al. |
| 8,810,392 B1 | 8/2014 | Teller et al. |
| 8,844,431 B2 | 9/2014 | Davis et al. |
| 8,978,904 B2 | 3/2015 | Hardy |
| 9,167,916 B2 | 10/2015 | Grant et al. |
| 9,318,007 B2 | 4/2016 | Valiulis et al. |
| 9,318,008 B2 | 4/2016 | Valiulis et al. |
| 9,898,712 B2 | 2/2018 | Johnson et al. |
| 2001/0010302 A1 | 8/2001 | Nickerson |
| 2001/0017284 A1 | 8/2001 | Watanabe |
| 2001/0051901 A1 | 12/2001 | Hager et al. |
| 2002/0036178 A1 | 3/2002 | Tombu |
| 2002/0108916 A1 | 8/2002 | Nickerson |
| 2002/0148794 A1 | 10/2002 | Marihugh |
| 2002/0158133 A1 | 10/2002 | Conzola et al. |
| 2002/0170866 A1 | 11/2002 | Johnson et al. |
| 2002/0178013 A1 | 11/2002 | Hoffman et al. |
| 2003/0000956 A1 | 1/2003 | Maldonado |
| 2003/0010732 A1 | 1/2003 | Burke |
| 2003/0053014 A1 | 3/2003 | Niiyama et al. |
| 2003/0055727 A1 | 3/2003 | Walker et al. |
| 2003/0057167 A1 | 3/2003 | Johnson et al. |
| 2003/0061973 A1 | 4/2003 | Bustos |
| 2003/0078691 A1* | 4/2003 | Holt ................... A47K 10/38 700/139 |
| 2003/0085187 A1 | 5/2003 | Johnson et al. |
| 2003/0106867 A1 | 6/2003 | Caterinacci |
| 2003/0141265 A1 | 7/2003 | Jo et al. |
| 2003/0150829 A1 | 8/2003 | Linden et al. |
| 2003/0193481 A1 | 10/2003 | Sokolsky |
| 2003/0217980 A1 | 11/2003 | Johnson et al. |
| 2003/0233288 A1 | 12/2003 | Sweeney et al. |
| 2004/0104239 A1 | 6/2004 | Black et al. |
| 2004/0118795 A1 | 6/2004 | Burke |
| 2004/0140278 A1 | 7/2004 | Mueller et al. |
| 2004/0140279 A1 | 7/2004 | Mueller et al. |
| 2004/0145451 A1 | 7/2004 | Failing |
| 2004/0178156 A1 | 9/2004 | Knorring et al. |
| 2004/0245197 A1 | 12/2004 | McElvaney |
| 2004/0260572 A1 | 12/2004 | George et al. |
| 2005/0077259 A1 | 4/2005 | Menz |
| 2005/0092702 A1 | 5/2005 | Nagel |
| 2005/0108098 A1 | 5/2005 | Syed et al. |
| 2005/0131578 A1 | 6/2005 | Weaver |
| 2005/0165649 A1 | 7/2005 | Mahaffey et al. |
| 2005/0168345 A1 | 8/2005 | Swafford et al. |
| 2005/0190072 A1 | 9/2005 | Brown et al. |
| 2005/0195081 A1 | 9/2005 | Studnicki et al. |
| 2005/0228718 A1 | 10/2005 | Austin |
| 2005/0279722 A1* | 12/2005 | Ali ........................ A47F 10/00 211/59.3 |
| 2006/0049122 A1 | 3/2006 | Mueller et al. |
| 2006/0071774 A1 | 4/2006 | Brown et al. |
| 2006/0102718 A1 | 5/2006 | Kajino et al. |
| 2006/0131401 A1 | 6/2006 | Do et al. |
| 2006/0163272 A1 | 7/2006 | Gamble |
| 2006/0163349 A1 | 7/2006 | Neugebauer |
| 2006/0186064 A1 | 8/2006 | Merit et al. |
| 2006/0237381 A1 | 10/2006 | Lockwood et al. |
| 2006/0279527 A1 | 12/2006 | Zehner et al. |
| 2006/0289637 A1 | 12/2006 | Brice et al. |
| 2007/0016494 A1 | 1/2007 | Brown et al. |
| 2007/0095903 A1 | 5/2007 | Suenbuel |
| 2007/0159298 A1 | 7/2007 | Zegelin et al. |
| 2007/0194037 A1 | 8/2007 | Close |
| 2007/0278164 A1 | 12/2007 | Lang et al. |
| 2008/0074264 A1 | 3/2008 | Sharpe et al. |
| 2008/0142458 A1 | 6/2008 | Medcalf |
| 2008/0164310 A1 | 7/2008 | Dupuy et al. |
| 2008/0208695 A1 | 8/2008 | Condron |
| 2008/0228346 A1 | 9/2008 | Lucas et al. |
| 2008/0249658 A1 | 10/2008 | Walker et al. |
| 2008/0250464 A1 | 10/2008 | Masucci et al. |
| 2008/0255894 A1 | 10/2008 | Falls et al. |
| 2008/0303637 A1 | 12/2008 | Gelbman et al. |
| 2009/0020548 A1 | 1/2009 | VanDruff |
| 2009/0084812 A1 | 4/2009 | Kirschner |
| 2009/0101606 A1 | 4/2009 | Olson |
| 2009/0133301 A1 | 5/2009 | Saxena et al. |
| 2009/0134103 A1 | 5/2009 | Saxena et al. |
| 2009/0139945 A1 | 6/2009 | Jacobson et al. |
| 2009/0157515 A1 | 6/2009 | Lafauci et al. |
| 2009/0179825 A1 | 7/2009 | Enarvi et al. |
| 2009/0248198 A1 | 10/2009 | Siegel et al. |
| 2009/0287992 A1 | 11/2009 | Bresolin et al. |
| 2009/0313365 A1 | 12/2009 | Whitehead |
| 2009/0319399 A1 | 12/2009 | Resta et al. |
| 2010/0017025 A1 | 1/2010 | Lockwood et al. |
| 2010/0072152 A1 | 3/2010 | Kim |
| 2010/0100460 A1 | 4/2010 | Aronson |
| 2010/0106588 A1 | 4/2010 | Jones et al. |
| 2010/0106662 A1 | 4/2010 | Ramaswamy |
| 2010/0108624 A1 | 5/2010 | Sparkowski |
| 2010/0133214 A1 | 6/2010 | Evans |
| 2010/0138304 A1 | 6/2010 | Boyarsky et al. |
| 2010/0169189 A1 | 7/2010 | Allison et al. |
| 2010/0169190 A1 | 7/2010 | Allison et al. |
| 2010/0176075 A1 | 7/2010 | Nagel et al. |
| 2010/0200526 A1 | 8/2010 | Barkdoll |
| 2010/0205045 A1 | 8/2010 | Zhang et al. |
| 2010/0206829 A1 | 8/2010 | Clements et al. |
| 2010/0258513 A1 | 10/2010 | Meyer et al. |
| 2010/0262554 A1 | 10/2010 | Elliott |
| 2010/0276383 A1 | 11/2010 | Hardy |
| 2011/0010271 A1 | 1/2011 | Black et al. |
| 2011/0017532 A1 | 1/2011 | Langford et al. |
| 2011/0018685 A1 | 1/2011 | Tanaka et al. |
| 2011/0022980 A1 | 1/2011 | Segal et al. |
| 2011/0106624 A1 | 5/2011 | Bonner et al. |
| 2011/0106653 A1 | 5/2011 | Wein |
| 2011/0128378 A1 | 6/2011 | Raji |
| 2011/0161146 A1 | 6/2011 | Walker et al. |
| 2011/0178863 A1 | 7/2011 | Daigle |
| 2011/0234514 A1 | 9/2011 | Gothard |
| 2011/0251920 A1 | 10/2011 | Watson |
| 2011/0304316 A1 | 12/2011 | Hachmann et al. |
| 2012/0004769 A1 | 1/2012 | Hallenbeck et al. |
| 2012/0044056 A1 | 2/2012 | Byun et al. |
| 2012/0120327 A1 | 5/2012 | Marx et al. |
| 2012/0147055 A1 | 6/2012 | Pallakoff et al. |
| 2012/0223943 A1 | 9/2012 | Williams et al. |

(56) References Cited

U.S. PATENT DOCUMENTS

| | | |
|---|---|---|
| 2012/0228240 A1 | 9/2012 | Gentile et al. |
| 2012/0245969 A1 | 9/2012 | Campbell |
| 2012/0246023 A1 | 9/2012 | Starr |
| 2012/0273442 A1 | 11/2012 | Hardy |
| 2012/0280810 A1 | 11/2012 | Wheeler |
| 2012/0284085 A1 | 11/2012 | Walker et al. |
| 2012/0284132 A1 | 11/2012 | Kim et al. |
| 2012/0286937 A1 | 11/2012 | Cote et al. |
| 2012/0330781 A1 | 12/2012 | Borrero |
| 2013/0002422 A1 | 1/2013 | Wiese et al. |
| 2013/0024023 A1 | 1/2013 | Siegel et al. |
| 2013/0030953 A1 | 1/2013 | Marsic |
| 2013/0037562 A1 | 2/2013 | Close |
| 2013/0109323 A1 | 5/2013 | Ruutu et al. |
| 2013/0132216 A1 | 5/2013 | Aihara et al. |
| 2013/0157569 A1 | 6/2013 | Torvmark et al. |
| 2013/0210360 A1 | 8/2013 | Ljung et al. |
| 2013/0214909 A1 | 8/2013 | Meijers et al. |
| 2013/0226742 A1 | 8/2013 | Johnson et al. |
| 2013/0235206 A1 | 9/2013 | Smith et al. |
| 2013/0275261 A1 | 10/2013 | Yoked |
| 2013/0317903 A1 | 11/2013 | Majrani |
| 2013/0332271 A1 | 12/2013 | Hay |
| 2014/0006225 A1 | 1/2014 | Bowman et al. |
| 2014/0006229 A1 | 1/2014 | Birch et al. |
| 2014/0043162 A1 | 2/2014 | Siciliano et al. |
| 2014/0055243 A1 | 2/2014 | Kerai |
| 2014/0100769 A1 | 4/2014 | Wurman et al. |
| 2014/0100999 A1 | 4/2014 | Mountz et al. |
| 2014/0110584 A1 | 4/2014 | Campbell |
| 2014/0113560 A1 | 4/2014 | Graube et al. |
| 2014/0139548 A1 | 5/2014 | Byers |
| 2014/0145828 A1 | 5/2014 | Bassan-Eskenazi et al. |
| 2014/0197953 A1 | 7/2014 | Valiulis et al. |
| 2014/0201042 A1 | 7/2014 | Meyer |
| 2014/0210692 A1 | 7/2014 | Waters et al. |
| 2014/0214195 A1 | 7/2014 | Worsley |
| 2014/0220883 A1 | 8/2014 | Emigh et al. |
| 2014/0239061 A1 | 8/2014 | Smith et al. |
| 2014/0247116 A1 | 9/2014 | Davidson |
| 2014/0258028 A1 | 9/2014 | Bynum et al. |
| 2014/0268949 A1 | 9/2014 | Kayser |
| 2014/0291405 A1 | 10/2014 | Harkes |
| 2014/0299620 A1 | 10/2014 | Swafford, Jr. et al. |
| 2014/0299663 A1 | 10/2014 | Shah et al. |
| 2014/0305891 A1 | 10/2014 | Vogler et al. |
| 2014/0352372 A1 | 12/2014 | Grant et al. |
| 2014/0360953 A1 | 12/2014 | Pichel |
| 2015/0088306 A1 | 3/2015 | Varrasso |
| 2015/0090675 A1 | 4/2015 | Vosshernrich |
| 2015/0356657 A1 | 12/2015 | Pas |
| 2015/0382150 A1 | 12/2015 | Ansermet et al. |
| 2016/0132822 A1 | 5/2016 | Swafford |
| 2016/0132823 A1 | 5/2016 | Swafford et al. |
| 2016/0132949 A1 | 5/2016 | Adoni et al. |
| 2017/0061525 A1 | 3/2017 | McCoy et al. |

FOREIGN PATENT DOCUMENTS

| | | |
|---|---|---|
| BE | 1008382 A3 | 4/1996 |
| CA | 2822926 A1 | 2/2014 |
| CA | 2822926 C | 3/2018 |
| CH | 223095 A | 8/1942 |
| CH | 412251 A | 4/1966 |
| CN | 1787003 A | 6/2006 |
| CN | 1972228 A | 5/2007 |
| CN | 101208718 A | 6/2008 |
| CN | 101472509 A | 7/2009 |
| CN | 101507380 A | 8/2009 |
| CN | 103703476 A | 4/2014 |
| DE | 969003 C | 4/1958 |
| DE | 1819158 U | 10/1960 |
| DE | 2002720 A1 | 7/1971 |
| DE | 7311113 U | 8/1973 |
| DE | 2232398 A1 | 1/1974 |
| DE | 2825724 A1 | 12/1979 |
| DE | 3116145 A1 | 11/1982 |
| DE | 8308485 U1 | 9/1983 |
| DE | 3211880 A1 | 10/1983 |
| DE | 8426651 U1 | 2/1985 |
| DE | 8520125 U1 | 1/1986 |
| DE | 3628609 A1 | 2/1988 |
| DE | 4307082 A1 | 9/1994 |
| DE | 19745813 A1 | 4/1999 |
| DE | 299026888 | 7/1999 |
| DE | 102004037365 A1 | 3/2006 |
| EP | 0004921 A1 | 10/1979 |
| EP | 0018003 A2 | 10/1980 |
| EP | 0048479 A1 | 3/1982 |
| EP | 0176209 A2 | 4/1986 |
| EP | 0224107 A2 | 6/1987 |
| EP | 270016 A2 | 6/1988 |
| EP | 298500 A2 | 1/1989 |
| EP | 0337340 A2 | 10/1989 |
| EP | 0398500 A1 | 11/1990 |
| EP | 0408400 A1 | 1/1991 |
| EP | 0454586 A1 | 10/1991 |
| EP | 0572119 A2 | 12/1993 |
| EP | 0587059 A2 | 3/1994 |
| EP | 0806749 A1 | 11/1997 |
| EP | 986980 A1 | 3/2000 |
| EP | 0779047 B1 | 4/2000 |
| EP | 1057164 A1 | 12/2000 |
| EP | 1249804 A2 | 10/2002 |
| EP | 1356425 A1 | 10/2003 |
| EP | 1395152 A1 | 3/2004 |
| EP | 2309377 A1 | 4/2011 |
| EP | 2367101 A1 | 9/2011 |
| FR | 2385365 A1 | 10/1978 |
| FR | 2526338 A1 | 11/1983 |
| FR | 2617385 A1 | 1/1989 |
| FR | 2859364 A1 | 3/2005 |
| GB | 697994 A | 10/1953 |
| GB | 140311 A | 11/1955 |
| GB | 881700 A | 11/1961 |
| GB | 1082150 A | 9/1967 |
| GB | 1088654 A | 10/1967 |
| GB | 2027339 B | 8/1982 |
| GB | 2180527 A | 4/1987 |
| GB | 2 232 398 A | 12/1990 |
| GB | D2037553 | 7/1994 |
| GB | 2281289 A | 3/1995 |
| GB | 2290077 A | 12/1995 |
| GB | 2297241 A | 7/1996 |
| GB | 2283407 B | 10/1997 |
| GB | 2392667 A | 3/2004 |
| GB | 2480462 A | 11/2011 |
| JP | 54168195 | 11/1979 |
| JP | 59218113 | 8/1984 |
| JP | 62060521 A | 3/1987 |
| JP | 6329463 | 2/1988 |
| JP | 6056224 | 3/1994 |
| JP | 6209945 | 7/1994 |
| JP | 7257714 | 9/1994 |
| JP | H11342054 A | 12/1999 |
| JP | 2007525393 A | 9/2007 |
| JP | 2007-284238 A | 11/2007 |
| KP | 10-2005-0066397 | 6/2005 |
| KR | 1020040089123 A | 10/2004 |
| KR | 1020060123497 | 6/2008 |
| KR | 1020090054501 | 12/2010 |
| KR | 1020100022890 | 8/2011 |
| KR | 1020100041969 | 11/2011 |
| NL | 106617 A | 11/1963 |
| RU | 2101731 C1 | 1/1998 |
| SE | 394537 B | 6/1977 |
| SU | 1600615 A3 | 10/1990 |
| WO | 91/15141 A1 | 10/1991 |
| WO | 9311449 A1 | 6/1993 |
| WO | 0061438 A1 | 10/2000 |
| WO | 0071004 A1 | 11/2000 |
| WO | 02/091885 A1 | 11/2002 |
| WO | 03016938 A2 | 2/2003 |
| WO | 2003032775 | 4/2003 |

(56) References Cited

FOREIGN PATENT DOCUMENTS

| WO | 03039301 | A1 | 5/2003 |
|---|---|---|---|
| WO | 2004104951 | A1 | 12/2004 |
| WO | 2005057444 | A1 | 6/2005 |
| WO | 2006023954 | A2 | 3/2006 |
| WO | 06133487 | A1 | 12/2006 |
| WO | 2007024639 | A2 | 3/2007 |
| WO | 2007073334 | A1 | 6/2007 |
| WO | 07140800 | A1 | 12/2007 |
| WO | 2007149967 | A2 | 12/2007 |
| WO | 10082835 | A1 | 7/2010 |
| WO | 10137883 | A2 | 12/2010 |
| WO | 11001024 | | 1/2011 |
| WO | 2011089452 | A1 | 7/2011 |
| WO | 2012166613 | A1 | 12/2012 |
| WO | 14080252 | A1 | 5/2014 |

OTHER PUBLICATIONS

Jan. 18, 2018—(AU) Examination Report—App 2015346254.
Apr. 2, 2018—(CN) First Office Action—App 201480024831.0.
May 30, 2018—(AU) Examination Report—App 2015346254.
Jul. 26, 2018 (US)—Non-Final Office Action—U.S. Appl. No. 14/939,220.
Jan. 31, 2019—(CN)—Second Office Action—App 201480024831.0.
Apr. 2, 2014—(RU)—Office Action—App 2013109955.
Sep. 5, 2013—(US)—Office Action—U.S. Appl. No. 12/876,919.
FFr Yello Pages 02003 Product Catalog, "Merchandising Ideas Made Easy for Every Retail Environment!", Cover p., 9-11, 48-49, 52-58, Back Cover.
Letter from Maria Comninou of Harness Dickey to Stephanie Knapp dated Nov. 11, 2009.
Document entitled "Relevant Prior Art for U.S. Appl. No. 10/772,010".
Shelf-edge digital price tags invade the South of France http://www.digitalsignagetoday.com/article/196299/Shelf-edge-digital-price-tags-invade-the-South-of-France.
eSignage http://www.episys.com/page/25/esignage.htm.
Electronic Shelf-Edge Labels ("Realprice system") http://www.hitech-lcd.com/ESL.htm.
Segmented Dot Matrix Electronic Shelf Label â€" SM Model' and 'Segmented Dot Matrix Electronic Narrow Facing Label â€" MM http://www.ilid.com.au/product-range.php#sm.
Electronic Shelf-Edge Labels http://www.fujitsu.com/downloads/EU/uk/pdf/industries/retail/retail-solutions-electronic-self-edge-labels.pdf.
The NZ ESL range from pricer http://www.electronicshelflabelling.co.nz/products/.
Retailer introduces electronic shelf-edge labelling http://www.conveniencestore.co.uk/news/retailer-introduces-electronic-shelf-edge-labelling/231511.article.
Revolutionary Shelf Edge Displays from in the UK http://crystal-display.com/digital-signage/shelf-edge-displays/.
XDS-1068: 10-inch All-in-One Multi-touch Signboard with Power-over-Ethernet http://www.iadea.com/product/xds-1068.
ZBD Solutions, Shelf Edge Labelling -http://www.zbdsolutions.com/solutions/index.html (printed Jan. 29, 2013).
Vectron, Speedy POS Solutions to make ezi-profits. 15 pages.
"How physics drives the supermarket industry," IOP Institute of Physics, PhysicsWorks. 4 pages.
John Ross, "Retail technology and the evolving shopper," Shopper Sciences. 11 pages.
Altierre Digital Retail, Altierre Corp., "Altierre Unveils E-Paper Product Family for Digital Signs and Price Tags." 2 pages, http://www.altierre.com/pr_e-paper.html (printed Jan. 31, 2013).
Suzanne Vita Palazzo, "New life for ESLs?, Advanced capabilities being built into electronic shelf labels may help overcome retailers' concerns about ROI.", Grocery Headquarters (www.groceryheadquarters.com), Mar. 2007, pp. 97-100.
Scott D. Walkins & Megan E. Henriksen of Anderson Economic Group, LLC, "Michigan's Item Pricing Law: The Price Tag for Retailers and Consumers," Dec. 11, 2010 (http://www.AndersonEiectronicGroup.com) 39 pages.
"Product Range :: I LID—The next generation in electronic shelf labels," : http://www.ilid.com.au/product-range.php, printed on Mar. 5, 2013, dale of website unknown but prior to the filing of the present matter.
"Electronic Shelf Label controlling various information in real lime (ESL)," hllp:l/cesl.co.kr/eng/product-inlroduction/cest-esl.hlml, CEST—Center for Embedded Software Technology, printed on Mar. 5, 2013, dale of website unknown but prior to the filing of the present matter.
Jun. 24, 2014—(MX)—Office Action—App MX/a/2013/001455—Eng Tran.
Mar. 3, 2015—(AU) Office Action—App 2011285929.
Mar. 3, 2015—(AU) Office Action—App 2013205058.
Apr. 6, 2015—(PCT) International Search Report—App PCT/US14/29124.
Dec. 14, 2015—(EP) Exam Report—App 11745636.8.
Apr. 19, 2016—(KR) Office Action—App 10-2015-7027591.
Apr. 22, 2016—(PCT)—International Search Report—App PCT/US2015/060404.
Apr. 22, 2016 (PCT) ISR and Written Opinion—App PCT/US2015/060404.
Jun. 22, 2016—(AU) Search Report—App 2014225837.
Jun. 28, 2016—(AU) Examination Report—App 2014228923.
Aug. 18, 2016—(EP) Office Action—App 14716461.0.
Jun. 10, 2014—(PCT) ISR & Written Opinion—App PCT/US2014/020797.
Sep. 19, 2016—(PCT) International Search Report—App PCT/US2016/032328.
Robertson, "Food Packaging: Principles and Practice, Second Edition", CRC Press, XP055301114, ISBN: 978-0-8493-3775-8, vol. 0, p. 308, dated Sep. 22, 2005.
George Coulouris et al., "Distributed Systems: Concepts and Design (5th Edition)", Addison-Wesley, US, XP055261658, ISBN: 978-0-13-214301-1 pp. Ch01-Ch06, Ch09-Ch10, ch13 Chapters 1, 3 and 19, dated May 7, 2011.
Oct. 27, 2016—(KR) Final Rejection—App 10-2015-7027591.
Nov. 18, 2016—(US) Final Office Action—U.S. Appl. No. 14/308,989.
Jul. 10, 2013—(US) Non-Final Office Action—U.S. Appl. No. 13/194,649.
Jan. 15, 2014—(US) Final Office Action—U.S. Appl. No. 13/194,649.
Jan. 3, 2014—(US) Final Office Action—U.S. Appl. No. 12/876,919.
Mar. 4, 2008—(US) Non-Final Office Action—U.S. Appl. No. 10/772,010.
Sep. 3, 2008—(US) Final Office Action—U.S. Appl. No. 10/772,010.
Mar. 9, 2009—(US) Non-Final Office Action—U.S. Appl. No. 10/772,010.
Aug. 19, 2009—(US) Final Office Action—U.S. Appl. No. 10/772,010.
Feb. 2, 2010—(US) Non-Final Office Action—U.S. Appl. No. 10/772,010.
Jun. 2, 2010—(US) Final Office Office Action—U.S. Appl. No. 10/772,010.
Oct. 7, 2015—(US) Non-Final Office Action—U.S. Appl. No. 14/308,989.
May 4, 2016—(US) Non-Final Office Action—U.S. Appl. No. 14/308,989.
Dec. 15, 2016—(US) Final Office Action—U.S. Appl. No. 13/836,680.
Jun. 2, 2016—(US) Non-Final Office Action—U.S. Appl. No. 13/836,680.
Sep. 23, 2014—(US) Non-Final Office Action—U.S. Appl. No. 13/836,680.
Mar. 24, 2015—(US) Non-Final Office Action—U.S. Appl. No. 13/836,680.
Dec. 14, 2015—(EP) Examination Report—App 11745636.
Mar. 20, 2008—(WO) ISR and Written Opinion—App. No. PCT/US05/02836.
Jan. 28, 2011—(EP) Supplementary Search Report—App. No. 05712322.6-2221.
Dec. 6, 2011—(EP) Office Action—App. No. 05712322.6-2221.
May 25, 2011—(EP) Office Action—App. No. 05712322.6-2221.
Nov. 24, 2011—(WO) ISR and Written Opinion—App. No. PCT/US2011/046209.

(56) References Cited

OTHER PUBLICATIONS

Feb. 21, 2013—(WO) IPR and Written Opinion—App. No. PCT/US2011/046209.
Apr. 2, 2014—(RU) Office Action—App. No. 2013109955.
Sep. 24, 2015—(WO) IPRP and Written Opinion—App. No. PCT/US2014/29124.
Apr. 6, 2015—(WO) Written Opinion—App. No. PCT/US2014/29124.
Mar. 1, 2017—(AU) Second Office Action—App. No. 2014228923.
Aug. 19, 2016—(EP) Extended ESR—App. No. 14723571.7-1903.
Apr. 6, 2015—(WO) ISR—App. No. PCT/US2014/29124.
Jun. 19, 2017—(CN) First Office Action and ISR—App. No. 201480026575.9.
Jun. 7, 2017—(CN) ISR—App. No. 201480026575.9.
Jul. 18, 2017—(KR) Office Action—App. 10-2015-7029832.
Sep. 7, 2017—(US)—Final Office Action—U.S. Appl. No. 14/591,421.
Oct. 28, 2018—(KR) Final Rejection—App 10-2017-7015819.
Jan. 10, 2019—(WO) International Search Report and Written Opinion—App. No. PCT/US2018/051775.
Apr. 22, 2019—(KR) Office Action—App. No. 10-2018-7015060.
Jun. 14, 2019—(EP) Partial European Search Report—App 19158063.8.
Jul. 6, 2018—(CN) Third Office Action—App 201480026575.9.
Nov. 7, 2017—(EP) Extended Search Report—App. No. 17177125.6.
Nov. 7, 2017—(EP)—Communication 94(3) EPC—App 14716461.0.
Nov. 28, 2017 (US)—Non-Final Office Action—U.S. Appl. No. 14/713,809.
Feb. 11, 2019—(KR) Office Action—App 10-2017-736152.
Mar. 15, 2019—(EP) Extended Europen Search Report and European Search Opinion—App 19153057.5.
Jul. 5, 2019—(CN) Office Action—App. No. 201580072899.0.
Feb. 23, 2018—(CN) Second Office Action—App. No. 201480026575.9—MM.
Mar. 14, 2018—(EP) Communication Pursuant to Article 94(3) EPC.

* cited by examiner

SYSTEM FOR INVENTORY MANAGEMENT

CROSS REFERENCE TO RELATED APPLICATIONS

This Application is a divisional of U.S. application Ser. No. 14/308,989, filed Jun. 19, 2014, which is a divisional of U.S. application Ser. No. 13/194,649, filed Jul. 29, 2011, which issued as U.S. Pat. No. 8,812,378 on Aug. 19, 2014, which is a continuation of U.S. application Ser. No. 12/876,919, filed Sep. 7, 2010, which issued as U.S. Pat. No. 8,938,396 on Jan. 20, 2015, which is a continuation-in-part of U.S. application Ser. No. 10/772,010, filed Feb. 3, 2004, which issued as U.S. Pat. No. 7,792,711 on Sep. 7, 2010. U.S. application Ser. No. 12/876,919, filed Sep. 7, 2010, also claims priority to U.S. Provisional Application No. 61/371,417, filed Aug. 6, 2010. All of the above referenced applications are herein incorporated by reference in their entirety.

BACKGROUND OF THE INVENTION

Field of the Invention

The present invention relates to shelving and product display and a system for aiding in determining the inventory on the shelf in a retail store.

Description of Related Art

A major cost in the operation of retail stores relates to inventory management, which includes the tracking and storing of inventory. A significant portion of this cost relates to product inventory management in the selling area of the store. A considerable portion of this inventory management cost is the periodic counting of product on the store shelves. This counting is necessary to determine the amount of product on the shelf and to help ensure the shelves are fully stocked.

Historically, the counting of inventory on store shelves was done manually and the results were recorded on paper. More recently, however, inventory has been counted manually with the use of a small hand-held computer that can be configured to transmit the entered data to a central computer that compiles data and can be programmed to make decisions regarding the purchase of products for restocking the shelves. These recent advances have helped reduce the cost of inventory management but counting inventory still requires significant manual labor. It would be beneficial to reduce the amount of manual labor required to count the inventory.

Another significant cost relating to inventory management is product theft. Certain items are relatively small but represent a high value to potential thieves who can either resell the items or use them for other illegitimate purposes, as in the case of certain pharmaceutical products. The losses generated by such thefts have a negative impact on the profitability of the retail stores.

Theft can be the result of both customers and employees actions and has been difficult to eliminate. Attempts to deter and prevent theft have proven to be only partially effective. For instance, in-store cameras often do not observe the theft clearly enough to catch or prosecute the thief. In addition, in-store security personnel are rarely in the correct position to actually observe a thief in action. As a result, theft continues to be a significant problem and cost in the management of inventory. It would be beneficial to provide aid in monitoring for theft.

Currently, retail stores can track the amount of product sold based on a number of items scanned at the checkout counter. While this ability has proven useful, certain inherent disadvantages result from the use of such a system. One inherent disadvantage is that the scanner only counts the number of products that are legitimately purchased. Therefore, if product is removed from the shelf but not purchased, the store is unable to determine the fact that product has been misplaced or stolen without visual inspection or detection. It would be useful to compare changes in product level on the shelves with the amount of product sold.

A second inherent disadvantage relates to store-run product promotions. A typical promotion will have a product located at the end of an aisle or in some type of promotional location that increase customer awareness of the product. Usually the product is also placed on the shelf in its traditional location so that customers familiar with the product placement of the store can find the product without undue searching. Therefore, customers can obtain the product being promoted in multiple places and it can be difficult to determine the effectiveness of a particular promotional display, i.e., the effect of a promotional discount offered for the product versus the normal purchasing of the product. It would be beneficial to more accurately determine the effectiveness of in-store promotions.

Another major cost of inventory management is associated with having to maintain more inventory in the store then is actually needed to meet customer demand. As current systems of inventory do not automatically indicate that a shelf is empty, retail stores tend to rely on output measured through the checkout or, alternatively, through visual inspection to determine if additional product needs to be placed on the shelf. In order to ensure the shelves are stocked with product, often more product than is typically needed for a given period of time will be placed on the shelf, sometimes in multiple facings on each shelf. The use of multiple facings tends to take up valuable shelf space that could otherwise be allocated towards additional product choices so as to maximize consumer satisfaction. It would be beneficial to reduce the amount of inventory of a particular product in the retail store.

Methods of minimizing the amount of required shelf space are known. For example, U.S. Pat. No. 6,041,720 to Hardy and U.S. Pat. No. 4,830,201 to Breslow, which are incorporated by reference in their entirety, teach a system for organizing and displaying items on a shelf through the use of a pusher assembly. While these systems are effective at moving items on a shelf from the back to the front of the shelf, the systems do not provide notification that a shelf is empty. Additionally, if multiple facings are being used for a single product, an uneven usage of the facings can result. If one facing of product is depleted before the other facings of the same product, the shelf will have a gap that provides a less satisfactory appearance to the consumer. This can happen even when ample product is still available. It would be beneficial to indicate to store personnel that shelves require adjustment so as to maintain a more satisfactory product appearance.

The above deficiencies and drawbacks known in the art are overcome by the present invention.

BRIEF SUMMARY OF THE INVENTION

An embodiment of the present invention includes a system for detecting and communicating the position of a pusher assembly on a shelf that comprises: a rear reflector strip; a control module with a microcomputer; and a laser assembly comprising a laser scanner. The laser scanner may be configured to transmit a laser beam to a rotating mirror, wherein the rotating mirror directs the laser beam to a mirrored reflective surface located along the length of the rear reflector strip. The mirrored reflective surface may also comprise a plurality of angled mirror sections that are configured to reflect the laser beam to the pusher assembly. The plurality of angled mirror sections may have a piecewise linear approximation of a parabola. Additionally, the mirrored reflective surface may include a plurality of flat sections located at the leading edge of each angled mirror section, with the plurality of flat sections configured to retro-reflect the laser beam back to the laser scanner. The control module may analyze the laser beam at the laser scanner and/or the angular location of the rotating mirror to detect the position of the pusher assembly on the shelf.

Another embodiment of the present invention includes a system for detecting and communicating the position of a pusher assembly on a shelf that comprises: a control module with a microcomputer and a light assembly. The light assembly may include a light transceiver located within a channel and behind the pusher assembly. The light transceiver may transmit a light signal to the pusher assembly. The light transceiver may receive the light signal reflected from the pusher assembly. Additionally, the microcomputer may analyze the light signal to determine the position of the pusher assembly on the shelf.

Another embodiment of the present invention includes a system for aiding in the prevention of theft of inventory that comprises: a laser assembly associated with a pusher assembly for transmitting data relating to the movement of the pusher assembly; and a store computer configured to receive the data and to transmit a signal in response to the data. The laser assembly may include: a rear reflector strip; a control module with a microcomputer; and a laser scanner configured to transmit a laser beam to a rotating mirror and the rotating mirror directing the laser beam to a segmented mirrored reflective surface located along the length of the rear reflector strip. The segmented mirrored reflective surface may include a plurality of angled mirror sections configured to reflect the laser beam to the pusher assembly and a plurality of flat sections configured to retro-reflect the laser beam back to the laser scanner. The plurality of flat sections may be located at the leading edge of each angled mirror section, the plurality of flat sections. Additionally, the microcomputer may analyze the laser beam at the laser scanner and the angular location of the rotating mirror to detect the position of the pusher assembly on the shelf. Additionally, the system may further include a security camera configured to respond to the signal, with the response including focusing in the direction of the laser assembly. The store computer may be further configured to provide a notification that a deviation in the typical movement of the pusher assembly has occurred.

BRIEF DESCRIPTION OF THE DRAWINGS

Several embodiments of the present invention are illustrated by way of example, but are not limited to the accompanying figures in which like reference numerals indicate similar elements and in which:

FIG. 15b illustrates a schematic of a beam, a fixed mirror, and a pusher assembly in accordance with the embodiment illustrated in FIG. 15a.

FIG. 16b illustrates a schematic of a beam, a fixed mirror, and a pusher assembly in accordance with the embodiment illustrated in FIG. 16a.

FIG. 17b illustrates a schematic of a beam, a fixed mirror, and a pusher assembly in accordance with the embodiment illustrated in FIG. 17a.

Figure 1A:
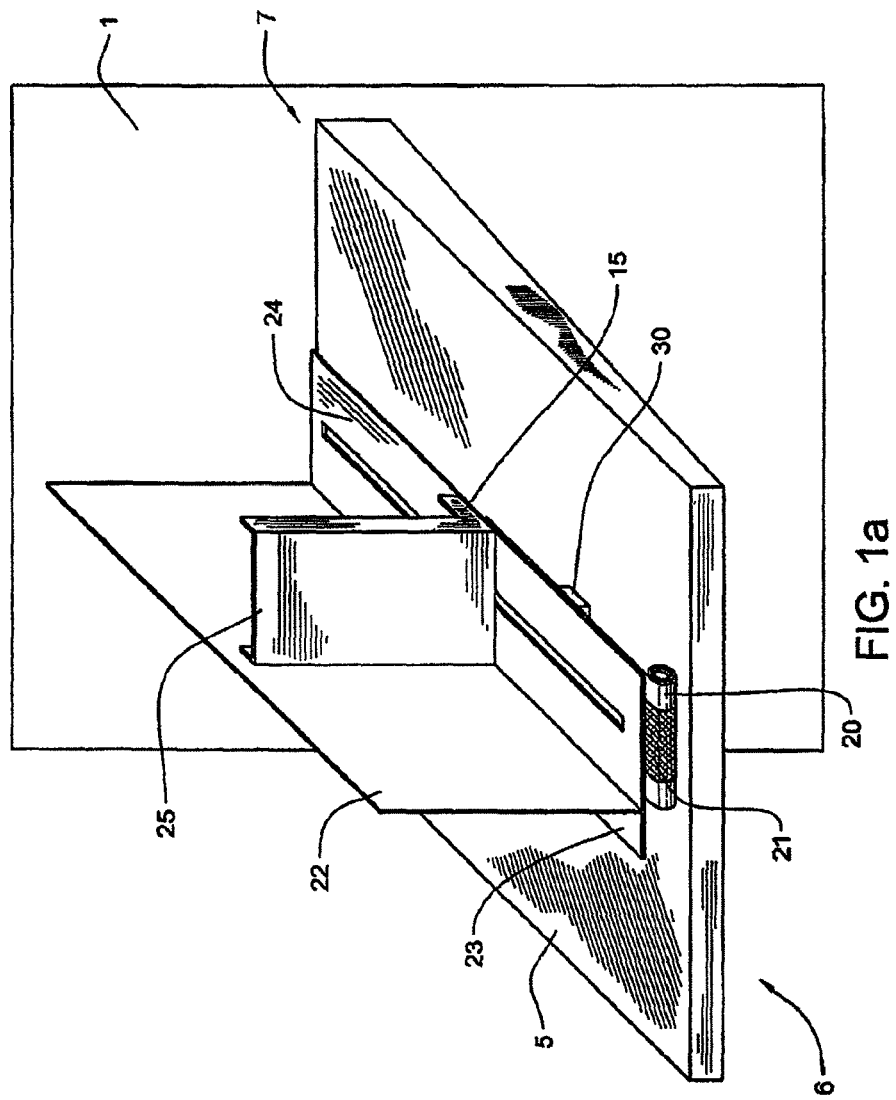
FIG. 1a illustrates an isometric view of an embodiment of the present invention including a pusher assembly and a sensor assembly.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE INVENTION

The present invention may be used with the shelf and pusher assembly system described in either U.S. Pat. No. 6,041,720 to Hardy or U.S. Pat. No. 4,830,201 to Breslow. The present invention may also be used with other pusher assemblies and shelf configurations known in the art.

FIG. 1a illustrates an embodiment of the present invention. A shelf wall 1 is configured to support a shelf 5. The shelf 5 has a front side 6, the front side 6 typically facing the aisle where customers walk when shopping, and a rear side 7. Mounted on the shelf is a pusher assembly 15. As depicted, the pusher assembly 15 includes a biasing mechanism such as a sheet coil spring 20 containing an indicia strip 21. The pusher assembly 15 further includes an integral divider wall 22 and a floor section 23 on one side of the divider wall 22 and a floor section 24 on the other side of the divider wall 22. The sheet coil spring 20 is operatively connected to a pusher 25 and can be used to urge the pusher 25, and the associated product, toward the front side 6 of the shelf 5. The pusher assembly 15 may be modular and can include a divider wall or an additional floor section that fit or mate in place.

As depicted FIG. 1a, a sensor assembly 30 can be mounted to the underside of the floor 24 over which the pusher 25 travels or to the shelf 5 and is configured to read the indicia strip 21. The sensor assembly 30 can be located at any position along the floor 24 and preferably near the coil spring 20. The indicia strip 21 is configured to provide a pattern that includes a representation associated with the position of the pusher 25. Thus, when the pusher 25 is moved as far as possible towards the rear side 7 (i.e. the facing is full of product), the sensor assembly 30 can scan a representation on the indicia strip 21 that reflects the pusher 25 being in that position.

The indicia strip 21 is depicted in FIG. 1a as a strip mounted on the sheet coil spring 20. The indicia strip 21 can be printed on a paper that can be attached to the coil spring 20, and can be black on white, white on black, or some other colors in a known manner. Alternatively, the indicia strip 21 can be printed or acid etched or laser etched, depending on the sensor assembly 30 used to read the indicia strip 21, in a known manner. Moreover, the indicia strip 21 can be separate from the coil spring 20. In this embodiment, the indicia strip 21 can be mounted alongside or adjacent to the coil spring 20.

The representations in the pattern contained on the indicia strip 21 can be optically readable or can be read based on other methods, including but not limited to passive variable capacitance, inductance, resistance, or magnetic, or active signal detection.

Figure 1B:
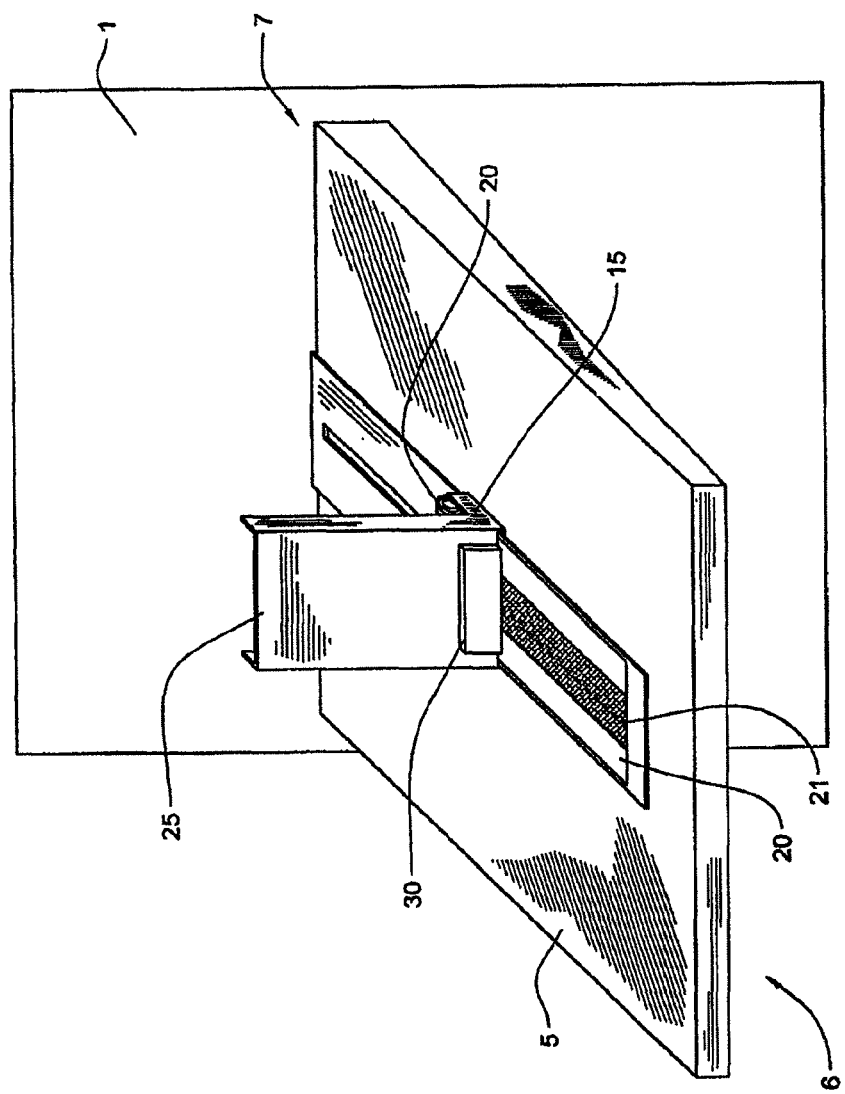
FIG. 1b illustrates another isometric view of an embodiment of the present invention including a pusher assembly and a sensor assembly

FIG. 1b depicts an alternative embodiment of the invention with the sensor assembly 30 mounted on the front side of the pusher 25, the sensor assembly 30 configured to read the indicia strip 21. In an alternative embodiment, the sensor assembly 30 could be mounted behind the pusher 25. Depending on the location of the coil spring 20, the sensor assembly 30 can be mounted in different places. Preferably, the sensor assembly 30 will be mounted in such a manner so as to avoid direct contact with the product on the shelf so as to minimize damage to the sensor assembly 30.

In another alternative embodiment, the sensor assembly 30 may be mounted within or on the pusher 25 and configured to read the indicia strip 21. In this embodiment, the indicia strip 21 is not mounted to or part of the coil spring; rather, the indicia strip 21 may be positioned along the top of the floor 24 or along the underside of the floor 24 and is read by the sensor assembly 30. In one aspect of this embodiment, the indicia strip 21 is of the type that may have variable magnetic or capacitive characteristics. The sensor assembly 30 may incorporate an analog oscillator whose frequency is determined by the magnetism or capacitance of the indicia strip 21 at the particular position of the pusher 25. The oscillator can directly modulate the radio frequency signal and send that signal to a central access point, as discussed below. The central access point can then demodulate the signal and use the signal to determine the position of the pusher 25.

For a black/white printed indicia strip 21, an optical infrared or visible light LED retro-reflective sensor array can be used. In an embodiment, the indicia strip 21 pattern containing the various representations could be 6 bits wide. In an alternative embodiment, depending on the width of the shelf and the desired precision, the pattern on the indicia strip could be more than 6 bits wide.

In yet another alternative embodiment, the indicia strip 21 could be less than 6 bits wide. Reducing the number of bits on the indicia strip 21 reduces the precision regarding the position of the pusher 25 but has the advantage of potentially avoiding the need to determine the dimension of the product. An embodiment with a reduced number of bits will be discussed below. The indicia strip will preferably include at least two representations so that the two representations can be used to reflect at least two positions of the pusher.

Depending on the indicia strip 21 and the sensor assembly 30, the number of measurable positions of the pusher 25 can be varied. For example, a configuration of a 6 bit wide pattern on an indicia strip 21 with a sensor assembly 30 that can scan 6 bits could scan at least 64 representations associated with 64 positions of the pusher 25. The representations in the pattern on the indicia strip 21 can be in many symbologies but a Gray Code provides that only one bit will change in each increment of movement, reducing potential errors. The sensor assembly 30 and the indicia strip 21 can be configured depending on the distance of travel of the pusher 25 and the expected size of the product.

In an embodiment, the coil spring 20 has a width of about 1 inch and the indicia strip 21 covers approximately 80% of the width of the coil spring 20. One skilled in the art will understand that other widths of the coil spring 20, and other dimensions of the indicia strip 21 are possible with the invention.

In an embodiment, the number of products on the shelf could be measured by the number of measurable positions of pusher 25. In such an embodiment, the position of the pusher 25 could be used to determine the amount of product on the shelf without the need to manually count the product. In an alternative embodiment, the number of measurable positions could exceed the number of products that can be placed in a facing. In this alternative embodiment, it would be preferable to have the number of measurable positions be an integer multiple of the number of products for ease of calculating the amount of product on the shelf. Increasing the number of measurable positions can therefore improve the ability of the system to precisely calculate the amount of product in a facing. This can become more important when a product package is unusually thin and therefore the incremental movement of the pusher 25 from one code to the next becomes a large percentage of the thickness of each product package that it is pushing.

Thus, as different products have different dimensions, a configuration of the sensor assembly 30 and indicia strip 21 might be desired with an increased number of measurable positions. For example, a configuration where 256 positions of the pusher 25 are measured might be desirable. Such a configuration could be used to determine the actual number of product on the shelf for a wide variety of product dimensions.

In an alternative embodiment, the sensor assembly 30 and indicia strip 21 can be configured to provide a decreased number of measurable positions. In an embodiment, four positions of the pusher 25 are measurable. In such a configuration, the shelf would provide information regarding how full the shelf was but would not provide the actual quantity of items on the shelf (assuming that 4 products would not fill the facing). This configuration could be useful in providing an automatic notification that a shelf was running out of product and needed to be restocked without the need to determine the product dimensions.

Figure 2A:
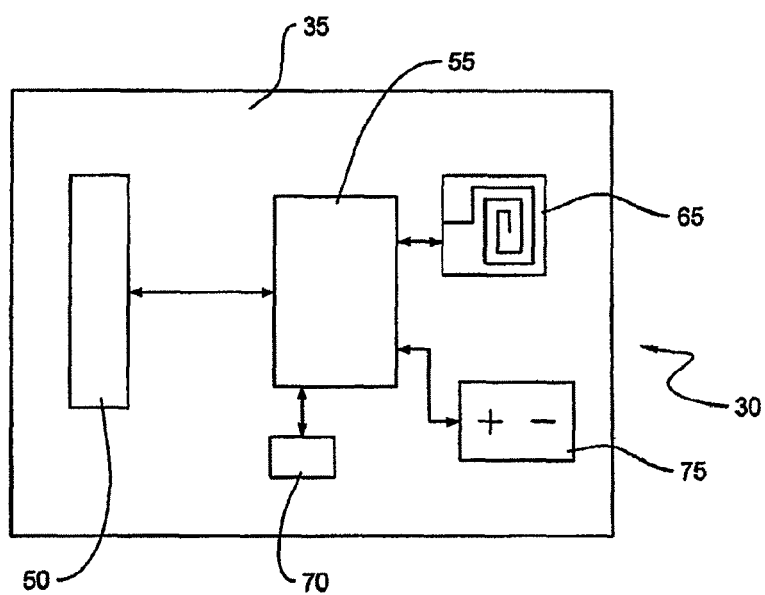
FIG. 2a illustrates a schematic view of an embodiment of the sensor assembly used with the present invention.

FIG. 2a depicts a schematic of an embodiment of the sensor assembly 30. A printed circuit board ("PCB") 35 is configured to support a sensor 50, the sensor 50 being compatible with the chosen type of indicia strip 21. A controller 55 is mounted to the PCB 35 and is configured to control the sensor 50 and transmit signals regarding the position of the pusher 25 via an antenna 65. The controller 55 can be configured to actuate the sensor 50 based on an input from the timing device 70. The timing device 70 can include, but is not limited to, a low power interval timer or a real time clock and is configured to provide information relating to the passage of time.

For a black/white printed indicia strip 21, the sensor 50 can include, but is not limited to, an optical infrared or visible light LED retro-reflective sensor. Preferably, for a 6 bit wide pattern, a linear array of 6 emitters/sensors will be used where one emitter/sensor is aligned with each bit position printed on the indicia strip 21. In an embodiment, the sensor 50 is positioned approximately 0.1 inches from the surface of the printed strip mounted on the indicia strip 21. As each emitter/sensor pair illuminates its bit position, a binary code can be assembled by the controller 55 that corresponds to the representation on the indicia strip 21, the representation associated with a position of the pusher 25.

Regardless of how the position of the pusher 25 is determined, the controller 55 generates a pusher code that represents the position of the pusher 25. The pusher code can be in digital or analog form and reflects the position of the pusher 25. In addition, the pusher code can be processed data or unprocessed data. Thus, the pusher code can be, but is not limited to, the scanned representation or a controller processed representation. Alternatively, the pusher code can be some other data that reflects the relative position of the pusher 25.

The controller 55 is powered by a power source 75. The power source 75 can be, but is not limited to, a long life battery, a wired power supply, or a solar panel. As can be appreciated, the type of power supply will have an impact on the functionality of the sensor assembly 30. If the power source 75 is a long life battery, a system configuration designed to utilize less energy will be preferable to avoid the need to change the battery on a frequent basis. If the power source 75 is a wired power source, the sensor 50 can be used more frequently without the need to replenish the power supply and the sensor assembly 30 can even be configured to provide real time information.

The controller 55 can be manufactured with a unique serial number. In this embodiment, each pusher 25 would be associated with a unique serial number or identity code. Alternatively, each indicia strip 21 can include a unique identity code along with the representation associated with the position of the pusher 25. Encoding the indicia strip 21 with a unique identity code can reduce the complexity of the controller 55 but typically will result in increased complexity of the sensor 50. Regardless, when the information is transmitted from the sensor assembly 30, the information may include an identity code and the pusher code representative of the pusher 25 position. In addition, information such as time of sending and the status of the circuitry or the status of the power source may also be transmitted.

Figure 2B:
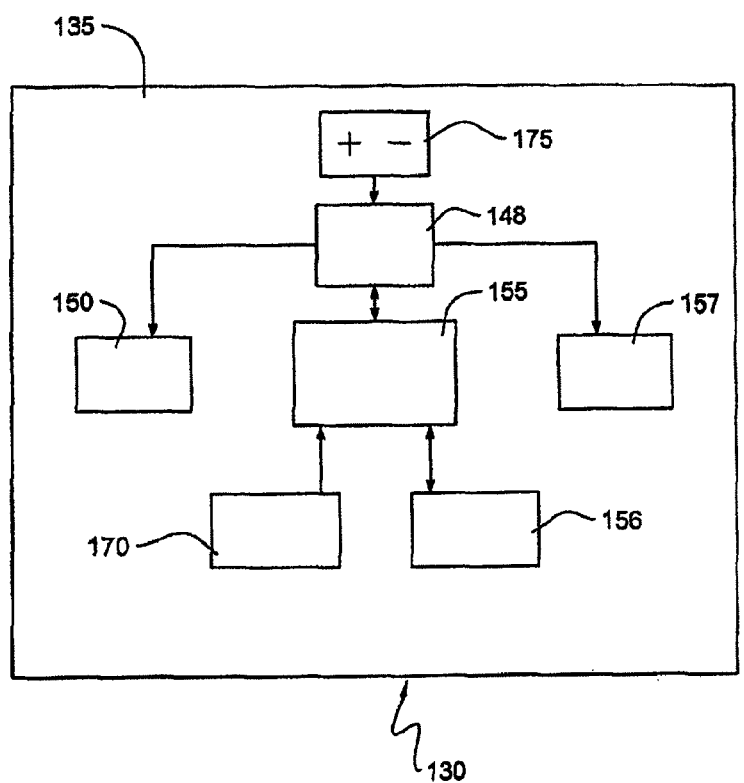
FIG. 2b illustrates a schematic view of an alternative embodiment of a sensor assembly used with the present invention.

FIG. 2b illustrates a schematic of an alternative embodiment of a sensor assembly 130. A PCB 135 has a power management circuit 148 configured to minimize use of power. The power management circuit 148 provides power to a sensor 150, a controller 155 and associated memory 156. The memory 156 can be volatile type memory, such as dynamic random access memory, but preferably the memory is non-volatile type memory, such as flash memory, so as to minimize power consumption. As depicted, the power management circuit 148 also provides power to a communication control 157. The power management circuit 148 can also provide power to a timing device 170. As depicted, the power management circuit 148 is powered by a power source 175.

In this embodiment, an input signal is provided to the controller 155. The input signal can be a signal generated by the timing device 170 or can be from some other source. The controller 155, in response, activates the sensor 150 by sending a signal to the power management circuit 148. The controller 155 receives data from the sensor 150 which is used to form the pusher code representative of the position of the pusher 25. The controller 155 compares the data scanned by the sensor 150 with the previous data scanned by the sensor 150, which is data residing in the memory 156. Depending on the configuration of the system, if the data scanned by the sensor 150 is the same as the previous scanned data, the controller 155 can be configured to wait until the end of the next interval of the timer. If the data scanned by the sensor 150 is different, the controller 155 can then activate the communication control 157 and provide the pusher code to the communication control 157 for transmission. The communication control 157 can then transmit the pusher code for further processing. The terms "transmit" and "transmission," unless otherwise specified, include sending of information over a wire or via a wireless system and can be direct or indirect (i.e. through a network). If the power source 175 is not a wired power supply, however, it is preferable to use a method of communication that consumes relatively little power.

Figure 2C:
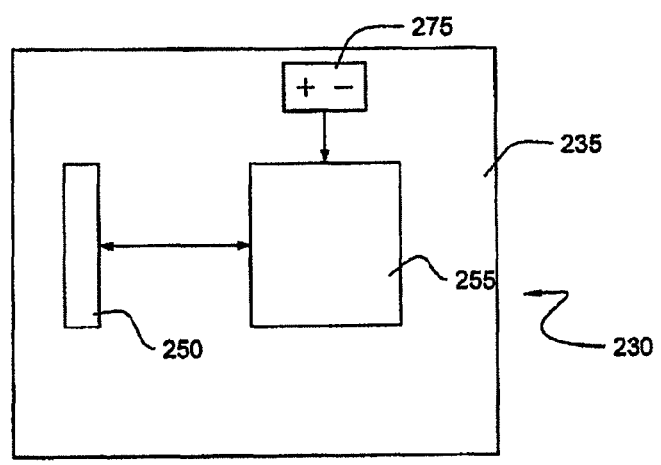
FIG. 2c illustrates a schematic view of another alternative embodiment of a sensor assembly used with the present invention.

FIG. 2c illustrates a schematic of an alternative embodiment of a sensor assembly 230. A PCB 235 is configured to support a sensor 250 and a controller 255. The controller 255 is powered by a power source 275 and is configured to control the sensor 250 and has integrated functionality, including but not limited to, time keeping, power management, and communication control. In an alternative embodiment, the controller 255 transmits the data scanned by the sensor 250 without any processing of the data. Thus, in this embodiment the pusher code is the data scanned by the sensor 250. In another alternative embodiment, the sensor and controller can be integrated together.

Figure 3:
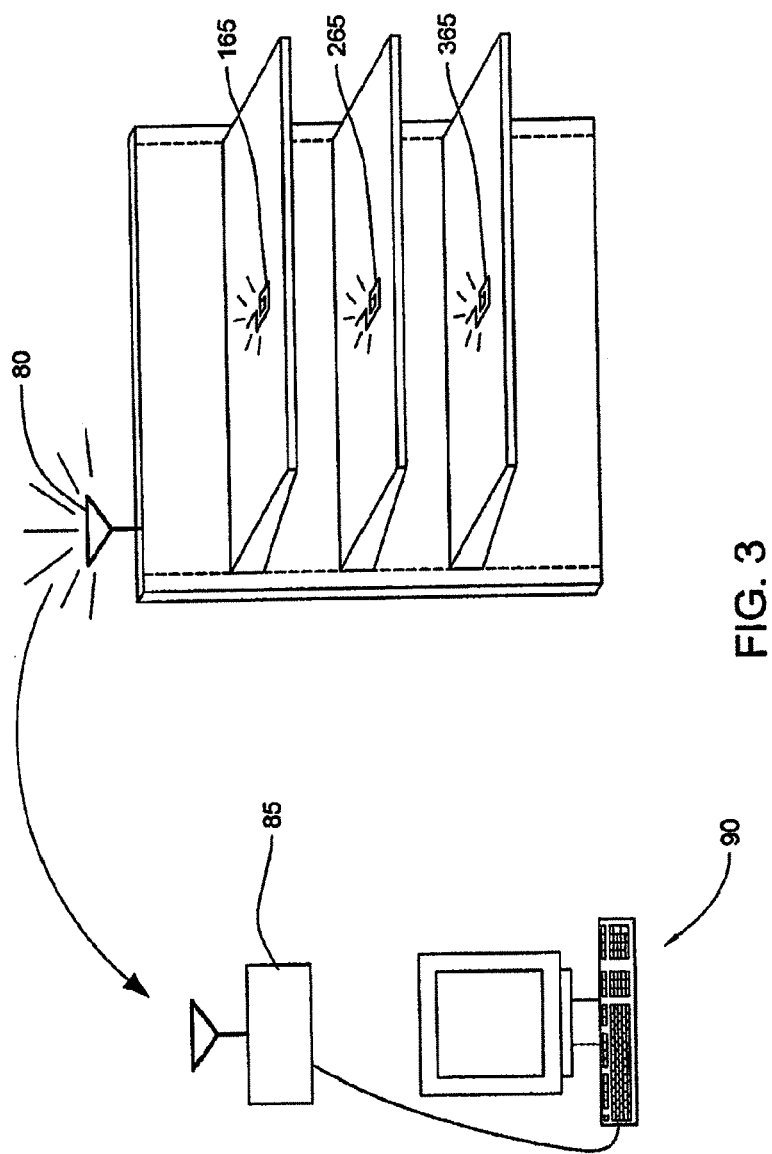
FIG. 3 illustrates a schematic view of an embodiment of the present invention, including an antenna, an access point and a store computer.

FIG. 3 illustrates a possible configuration for providing data regarding the position of the pusher 25 to a processing device, such as a store computer 90. As depicted, an access point 80 is configured to transmit information to a central access point 85. The central access point 85 is connected to the store computer 90 and provides the data received from the access point 80 to the store computer 90. The data sent from the access point 80 is received from antenna 165, antenna 265 and antenna 365. The antenna 165 is associated with a particular pusher 25 and sensor assembly 30, typically via the use of a unique serial number that can be associated with a controller. The antenna 265 and the antenna 365 are also associated with different pushers 25 and sensor assemblies 30, each with a unique serial number. Alternatively, one or more antennas could be associated with more than one pushers 25.

In general, the power required to transmit wireless signals increases as the transmission distance increases. Thus, especially with a battery powered controller, the preferred wireless communication configuration will transmit low powered signals over a short distance. As depicted in FIG. 3, the various antennas 165, 265 and 365 transmit a wireless signal to the access point 80, located nearby, thus a low powered transmission is suitable. The access point 80 then re-transmits the signal to the central access point 85 using higher power during the secondary transmission. In this manner, the power source for the various controllers connected to the antenna 165, 265 and 365 can more readily utilize a power source 75 consisting of a long life battery. While the transmission method between access point 80 and central access point 85 is depicted as wireless, the access point 80 and central access point 85 can also communicate over wires.

In an alternative embodiment, the controller 55 corresponding to each pusher 25 can be hard-wired to an access point 80 so that the controller 55 transmits the data to access point 80 over one or more wires. The access point 80 can then transmit the data to the store computer 90. In another alternative embodiment, the data is transmitted directly from the sensor assembly 30 to the store computer 90. In this embodiment, the transmission can be either wireless, such as an infrared, ultrasonic or electromagnetic wave transmission, or can be hard-wired. Depending on the method of transmission, it may be desirable to transmit the data from the sensor assembly 30 to the store computer 90 via a network protocol that can compensate for, or minimize, communication errors.

The use of a wired connection can provide a useful source of power and can reduce the possibility of communication collisions, especially if the signals are directly to the store computer 90. In addition, by providing additional power, the controller 55 can be configured to provide a real time update on the level of product on the shelf or in the store so that more accurate decisions regarding the need to order additional product can be made. This configuration also makes it possible to recognize and send alerts regarding potential theft situations based on the real-time movement of the pusher 25. The real time product information may make it possible to provide a more responsive inventory system so as to lower the amount of inventory in the store and therefore reduce the cost of inventory.

Wireless systems, on the other hand, provide increased flexibility in installation and can be readily installed in existing shelves without the need to install wires for either power or communication. In addition, the use of a wireless system allows for the gradual installation of an inventory system. For example, items of high value (and therefore suffering from an increased likelihood of being stolen) or items that tend to have significant variations in customer demand can be monitored first.

In an embodiment, the sensor assemblies 30 may be networked together via a series of wireless access points 80 where each access point 80 accepts transmissions from any sensor assembly 30 in the vicinity of the access point 80. Thus, in an embodiment, there exist a number of wireless access points 80 and the access points 80 are connected via a network, where the network transmits the data to the store computer 90. In an alternative embodiment, each wireless access point 80 transmits the data directly to the store computer 90.

Naturally, some combination of network and direct transmission is also possible and is considered within the scope of the present invention. For example, a battery powered sensor assembly 30 could communicate via a low powered wireless transmission to an access point 80, the access point 80 being powered by a wired power supply. The access point would transmit a wireless signal to a central access point 85 that was powered by a wired power supply. The central access point 85 could be connected via a wire to the store computer 90.

Referring back to FIG. 2a, if a timing device 70 comprises a low powered timer, the controller 55 can rest dormant until a signal from the timing device 70 indicates it is time to send an update regarding the position of the pusher 25. An example of a low powered timer includes a low powered, low cost interval timer. Low powered, low cost interval timers may not be highly accurate and therefore multiple pusher devices in a store will likely randomize their transmission times so as to reduce transmission collisions. The period of data transmission typically will be on the order of a few milliseconds, and therefore, it is unlikely that signals from different controllers will be sent at the same time. This likelihood can be further decreased if the controllers are not all started at the same time. If the transmissions only occur a few times per day (i.e. to provide periodic updates on the amount of product on the shelf), the likelihood of communication collisions is further reduced. In addition, the decreased frequency of transmission and the short transmission period helps reduce the amount of power consumed.

In an alternative embodiment, the sensor 50 continuously monitors the indicia strip 21. When a product is removed from the shelf, the pusher 25 will move and the sensor 50 can scan a new representation on the indicia strip 21 corresponding to the new position of the pusher 25. The controller 55 can then send a transmission including the new position of the pusher 25 to the store computer 90 (i.e. the controller 55 can send a new pusher code). In this alternative embodiment, the store computer 90 can monitor the amount of product on the shelf in real time.

As depicted in FIG. 3, the transmission of signals, from the antenna 165 to the store computer 90 for example, is a one-way transmission. In an alternative embodiment, the system may be set up to handle two-way transmission of signals between the sensor assembly 30 and the store computer 90. In a two-way wireless system, additional hardware such as a receiver is included in the sensor assembly 30. The two-way system allows for bi-directional transfer of information.

For example, the store computer 90 could query a particular controller 55 about the position of the associated pusher 25. The controller 55 could activate the sensor 50 in response to the query and determine a pusher code reflecting the position of the pusher 25. The controller 55 could then transmit the pusher code along with the identity code of the controller 55 to the store computer 90. Based on the pusher code, the store computer 90 could determine the inventory level of a product. To avoid activating the wrong controller 55, the store computer 90 could include the identifying code in the transmission. The store computer 90 may store, access, and perform functions with the identifying codes of all or a subset of the controllers or pusher systems in the store.

In an embodiment, all the controllers 55 associated with products purchased from the same vendor could be queried just before the order to the respective vendor was placed. The order to that vendor could then be updated with the latest product inventory information. In this manner, the order placed to the vendor could be made more accurate without the need for laborious counting of products on the shelf.

Some vendors are responsible for stocking the shelves in a retail store instead of the store personnel. In a situation where a vendor was responsible for stocking the shelves, an embodiment of the present invention could provide the vendor with updates in response to queries from the vendor's computer. In an embodiment, the vendor could track the amount of product available on the shelves as frequently as desired, even in real time.

For example, a vendor could send a query to a controller 55 via a wide area network ("WAN"). The controller 55 could determine the position of the pusher 25 and transmit a signal back to the vendor via the WAN. In an alternative embodiment, the vendor could communicate with the store computer 90 to obtain information regarding the inventory level of products on the shelf.

In an embodiment, the vendor could control the manufacturing process of the product in response to inventory levels on the shelves. As can be appreciated, the vendor would have an increasingly effective inventory system if multiple stores were networked to the vendor's computer so that the aggregate amount of product on all the store shelves could be determined. If the vendor was only connected to a single store, the information, while less indicative of the total inventory, could provide valuable details regarding patterns of behavior of the consumers.

Figure 4:
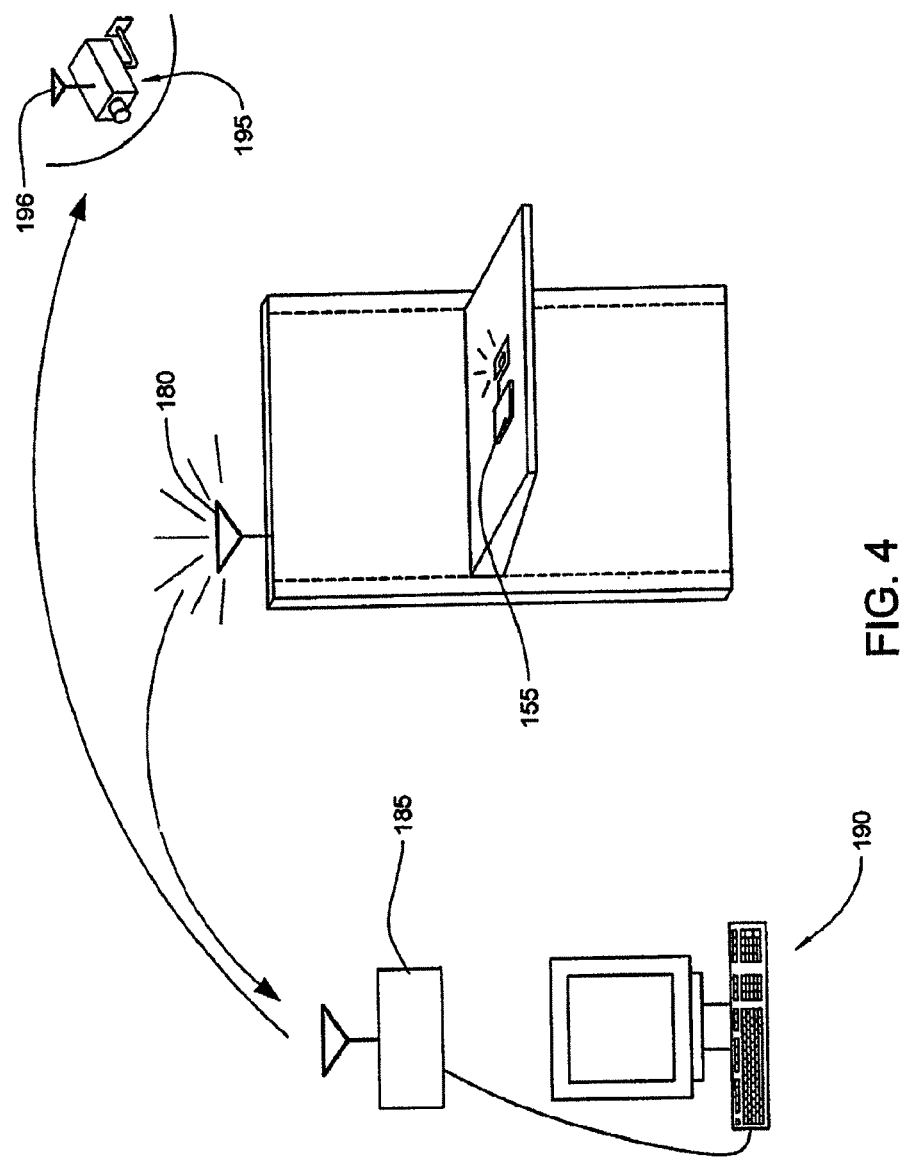
FIG. 4 illustrates a schematic view of an embodiment of the present invention, including an access point, a store computer and a security camera.

FIG. 4 illustrates an embodiment of the present invention that includes the use of a security camera 195. As depicted, an access point 180 receives a signal from a controller 155 indicating that pusher 25, not shown, has moved. The access point 180 transmits the signal to a central access point 185 that is connected to a store computer 190. The store computer 190 determines that the rate of change in product level of the product associated with the controller 155 is indicative of a potential theft. The store computer 190 then transmits a signal, either wired, or wirelessly, to an antenna 196, which is mounted to the security camera 195. The signal instructs the security camera 195 to monitor a position associated with the location of the controller 155. As can be appreciated, security personnel can sometimes provide a more nuanced response, thus it is advantageous to notify security personnel. Therefore, the store computer 190 can also notify security personnel to monitor the area by displaying a warning on the store computer screen or by transmitting a signal to a security computer or by activating an audible tone or flashing light in the vicinity of the potential theft or by other known methods of notification such as a signal to the pager or beeper carried by the security personnel.

Information from the security camera could be sent to a television or other visual display device that is located near the location where the potential theft is occurring. The visual display device could display an image of the potential thief such that the potential thief could appreciate the fact that the thief was being watched.

As can be appreciated, the controller 155 preferably monitors the position of pusher 25 on a frequent or even real time basis so as to provide a more timely response. If a power source 75 consisting of a long life battery is utilized, it may be beneficial to utilize a controller that can determine a potential theft situation without the need to transmit data to the store computer 190. In such an embodiment, the controller can be configured to transmit data to provide inventory level updates and also to provide security notifications.

As can be appreciated, the position of the potential theft relative to the security camera 195 would be beneficial to provide an instruction to the security camera 195 to focus on a particular position. This positional information could be generated by a number of methods, including providing the store computer 190 with the security camera coordinate system for the security camera 195. The position of the controller 155 relative to the security camera 195 could be determined during setup and during a potential theft situation; the position of the controller 155 could be used to direct the focus of the security camera 195. Alternatively, the security camera 195 could be configured to focus in several positions, such as three points along an aisle, and the store computer 190 could indicate which position was the most appropriate for the particular situation. The described methods are illustrative because of the numerous methods of controlling the security camera 195 that exist.

In an embodiment with a two-way transmission between the store computer 190 and the controller 155, the store computer 190 could signal to the controller 155 to activate a device capable of providing an audible warning tone.

In another embodiment, the controller 155 could determine that a potential theft had occurred and could provide a notification, including the sounding of an audible warning tone. In addition, the controller 155 could transmit a signal to the store computer 190. In this alternative embodiment, the sensor assembly 30 would preferably include a timing device 70 so as to allow the controller 155 to more readily determine whether the rate of movement of pusher 25 exceeds a preset level.

In another embodiment, a two-tiered response could be implemented. If the change in position of the pusher 25 was greater than normal, a signal could be transmitted to the security camera 195. In addition, an inaudible notification could be provided directly to security personnel. If the positional change of the pusher 25 more clearly indicated a potential theft, an audible alarm and flashing lights could also be activated. Thus, the response could be configured to more carefully match the situation.

Figure 5:
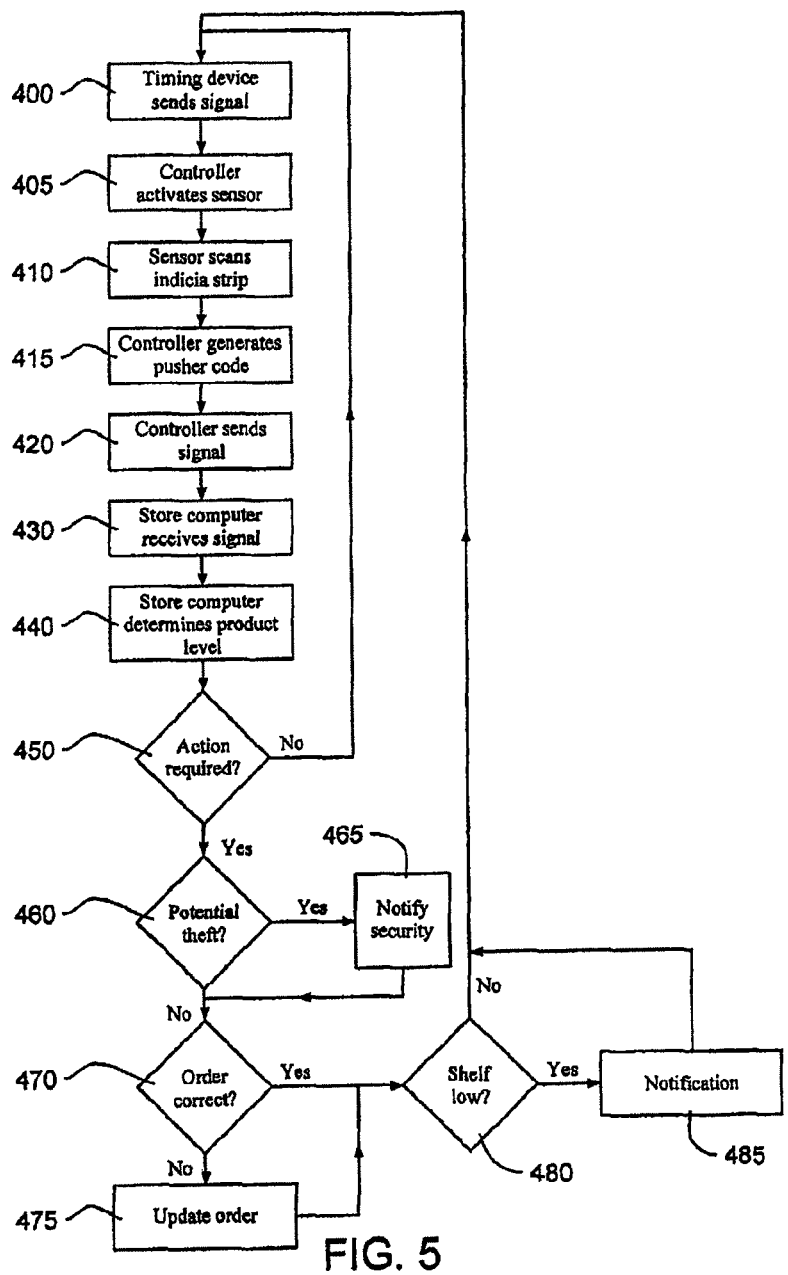
FIG. 5 illustrates a flow chart demonstrating a method of providing data from the indicia strip to a store computer.

FIG. 5 illustrates an embodiment of a method for determining the amount of a particular product available in a facing on a shelf. In this embodiment, the sensor assembly 30 uses a timing device 70 consisting of a low powered interval timer. The controller 55 is initially in a dormant state and only the timing device 70 is running. In step 400, the timing device 70 provides a signal to the controller 55 that the time interval is complete. In step 405 the controller 55, in response to the signal from the timing device 70, becomes activated and the controller 55 then activates the sensor 50.

In step 410, the sensor 50 scans the representation contained in the pattern on the indicia strip 21 so that the controller 55 can generate the pusher code representative of the position of the pusher 25. In step 415, the controller 55 generates the pusher code in response to the pattern scanned by the sensor 50. In step 420, the controller 55 transmits a signal that can include the unique serial number of the controller 55 and the pusher code, to the store computer 90.

Next, in step 430, the store computer 90 receives the data from the controller 55. In an embodiment, the transfer of data from the controller 55 to the store computer 90 is direct. In another embodiment, the controller 55 transmits data to the store computer 90 indirectly through an access point or a network.

Then, in step 440, the store computer 90 calculates the amount of product on the shelf based on the position of the pusher 25. The store computer 90 also updates the inventory list at this point. In an embodiment where multiple facings have the same product, the total amount of product on all of the facings that have that product can be calculated. In an embodiment, the calculation of product in a facing can be accomplished through the use of a database of products and the relevant dimensions of a product, and the position of the pusher. In another embodiment, the number of products placed in the facing can be provided during setup of the controller 55 for that product. The position of the pusher 25 and the number of products corresponding to that position of the pusher 25 can be used to calculate the quantity of remaining products based on a later position of the pusher 25 through the use of well known extrapolation techniques.

In another embodiment, the position of the pusher 25 can be one of four positions representing $X>3/4$, $3/4 \geq X > 1/2$, $1/2 \geq X > 1/4$, and $X \leq 1/4$. This latter embodiment provides less precise information but also requires less computation effort to provide the approximate inventory level. In addition, this embodiment can be used to manage inventory without the need to determine and track the dimension of the product. In an embodiment, the amount product on the shelf can be roughly determined based the number of facings containing the product and whether the pusher 25 for each facing is in a position representative of a full, mostly full, low or almost empty facing.

In step 450, the store computer 90 determines whether any action is required. In an embodiment, a potential theft, a decrease in the inventory below a pre-set level or the emptying of a facing of product while ample product still remains on the shelf in other facings would indicate that some action was required. For example, the store computer 90 could determine that, based on historical usage and the average delivery time and the cost per delivery, the current level of inventory was low. In an alternative embodiment, the minimum inventory level could be preset and once the inventory level drops below a preset level, the store computer 90 could determine that the product level was low.

In step 460, the store computer 90 would determine if a potential theft was taking place. In an embodiment, the store computer 90 could compare the current level of inventory, based on the position of the pusher 25, to the previous level of inventory. If the rate of change in inventory level exceeded a preset level, the store computer 90 would determine that a potential theft was taking place. In step 465, the store computer 90 would notify security. The notification could include a page to security or a signal to a security camera 195 to focus in a particular direction.

Next, in step 470, the store computer 90 would determine if the existing order needed to be modified. The store computer 90 could compare the current product requirement to the current order. If the store computer 90 determined that an amount of product ordered was insufficient, the store computer 90 would proceed to step 475. In step 475, the store computer 90 would update the current inventory order so that the inventory order matched the current product requirements.

Next, in step 480, the store computer 90 would determine if a facing on a shelf was empty. If there was an empty facing, the store computer 90 would then notify the store management that there was an undesirable empty facing in step 485. The store management could then decide the appropriate action to take depending on the type of product and the availability of substitute goods. If the facing was not empty, the store computer 90 would wait until the next product update.

Figure 6:
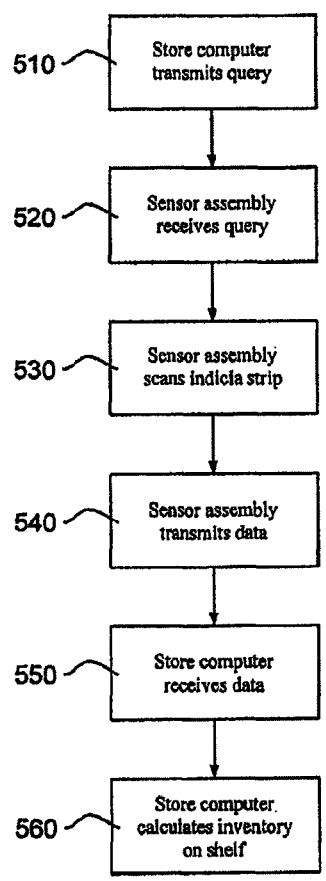
FIG. 6 illustrates a flow chart demonstrating a method of determining the amount of product on the shelf via a query from store computer.

FIG. 6 depicts an embodiment of a method for determining the amount of inventory on the shelf in a two-way system. In step 510, the store computer 90 sends a query to a sensor assembly 30. The sensor assembly 30 contains a controller 55 that is identified by a unique serial number or identifying code.

In step 520, the sensor assembly 30 receives the query from the store computer 90. In response to the query, the controller 55 activates the sensor 50 and prepares to receive data reflecting the position of the pusher 25. In step 530, the sensor 50 scans the indicia strip 21 and the controller 55 generates a pusher code representative of the position of the pusher 25.

In step 540, the sensor assembly 30 transmits the pusher code representative of the position of the pusher 25 along with the unique serial number of the controller 55 to the store computer 90.

Next, the store computer 90 receives this transmission in step 550. This transmission can be sent directly from the sensor assembly 30 to the store computer 90 or, preferably, it can be indirectly through a network. The transmission can be sent in a wireless manner, over wires, or some combination of a wireless and wired transmission.

Then, in step 560, the store computer 90 determines the level of inventory on the shelf. In an embodiment, the determination can be based on the product dimension and the position of the pusher 25. In an alternative embodiment, the determination can be based solely on the position of the pusher 25.

Figure 7:
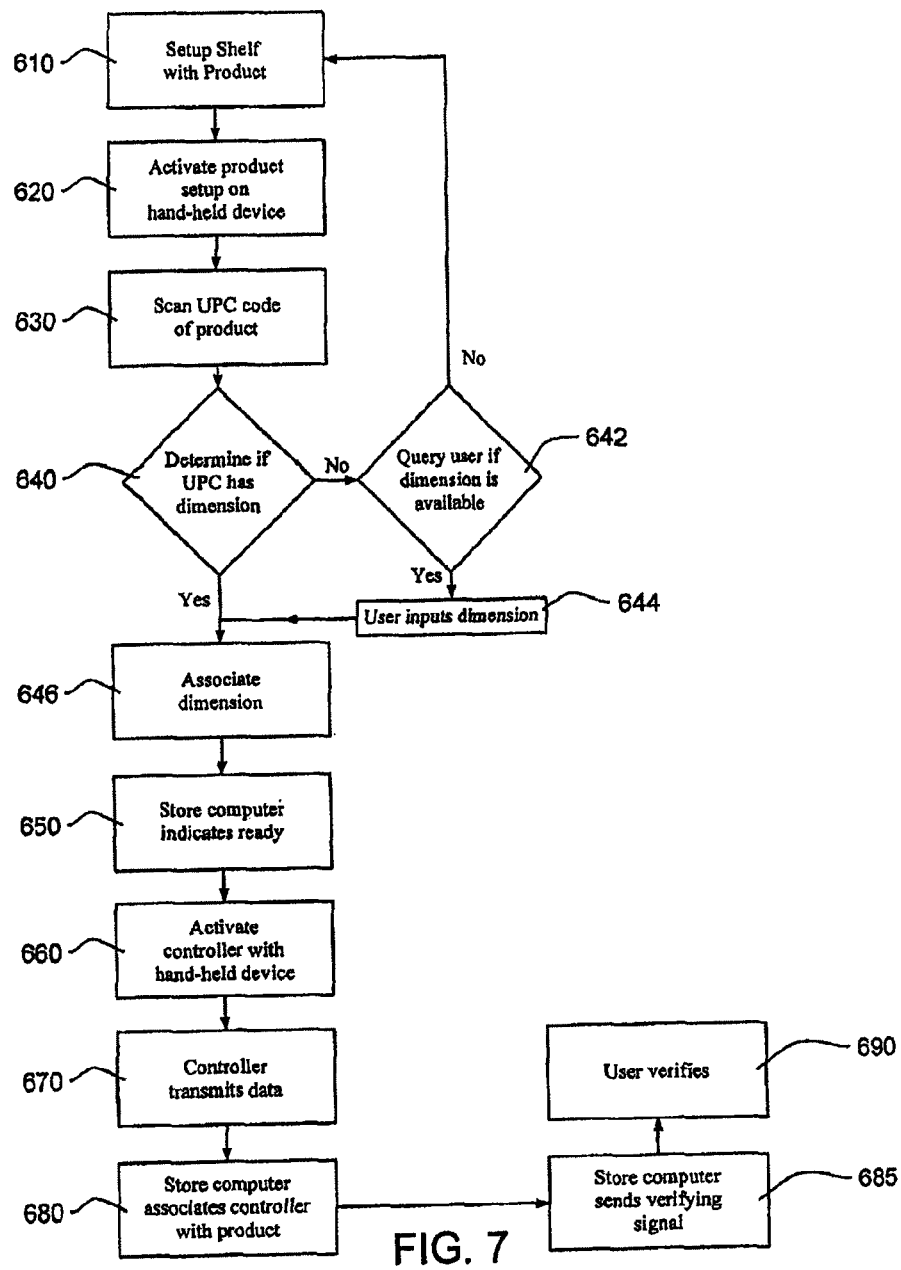
FIG. 7 illustrates a flow chart demonstrating a method of updating the association of particular product with a particular shelf location.

FIG. 7 depicts an embodiment of a method for setting up a controller for a particular product. In step 610, the product can be placed on the shelf in the appropriate facing. Alternatively, step 610 can be skipped and the set-up can start with step 620.

In step 620, a set-up button on a hand-held device is pressed. The hand-held device is configured to transmit a signal to a store computer 90 indicating that the user of the hand-held device is about to associate a product with a serial number or identifying code of a controller 55. Preferably, the transmission of signals between the hand-held device and the store computer 90 is done in a wireless manner. In an embodiment, the store computer 90 provides feedback to the user indicating that the store computer 90 is ready to proceed. In an alternative embodiment, no feedback is provided.

Next, in step 630, the UPC code of the product is scanned and transmitted to the store computer 90. Then, in step 640, the store computer 90 looks up the product dimension based on the UPC code. If the UPC code does not have a listed dimension, the store computer 90 checks if the user can input the needed dimension in step 642. If the user cannot, the setup is terminated and the user can try to setup a new product. If the user can determine the dimension, the user enters the dimension in step 644.

Next, in step 646, a dimension is associated with the UPC code. Then, in step 650 the store computer 90 sends a signal to the hand-held device to indicate that the user should proceed with the setup.

Next, in step 660 the user activates the controller 55 with the hand-held device. In an embodiment, an optical setup sensor is mounted on the pusher assembly and is connected to the controller 55. Preferably, the setup sensor is recessed in the pusher 25 but could be mounted in other locations such as on the top or the side of the pusher 25. The hand-held device will be configured to transmit a signal to the setup sensor. The act of transmitting the setup signal to the setup sensor will cause the controller 55 to awake from a dormant state.

Then in step 670, the controller 55, in response to the setup signal, will send data indicating that the controller 55 is being setup to the store computer 90. The data will include the unique serial number of the controller 55. The data may also include a generic setup code or a setup code corresponding to the hand-held scanner and can include a pusher code representative of the position of the pusher 25. In the event that multiple hand-held devices are being utilized at the same time, it may be beneficial to provide a setup code associated with a particular hand-held device.

Next, in step 680, the store computer 90 will receive the data from the controller 55. If the data includes the pusher code, the store computer 90 can calculate the amount of product in the facing at this time. In step 685, the store computer 90 sends a signal to the hand-held device indicating that the controller 55 has been setup and associated with the UPC code of a particular product. In addition, if the position of the pusher 25 was originally included, the store computer 90 can also provide a calculation of the current quantity of product in the facing that was just set up. In addition, the store computer 90 requests that the user verify that the setup information is correct.

Finally, in step 690, the user indicates the information is correct. Upon verification, the setup for the controller 55 is complete. To change the product associated with the controller 55, the process can be repeated.

Figure 8:
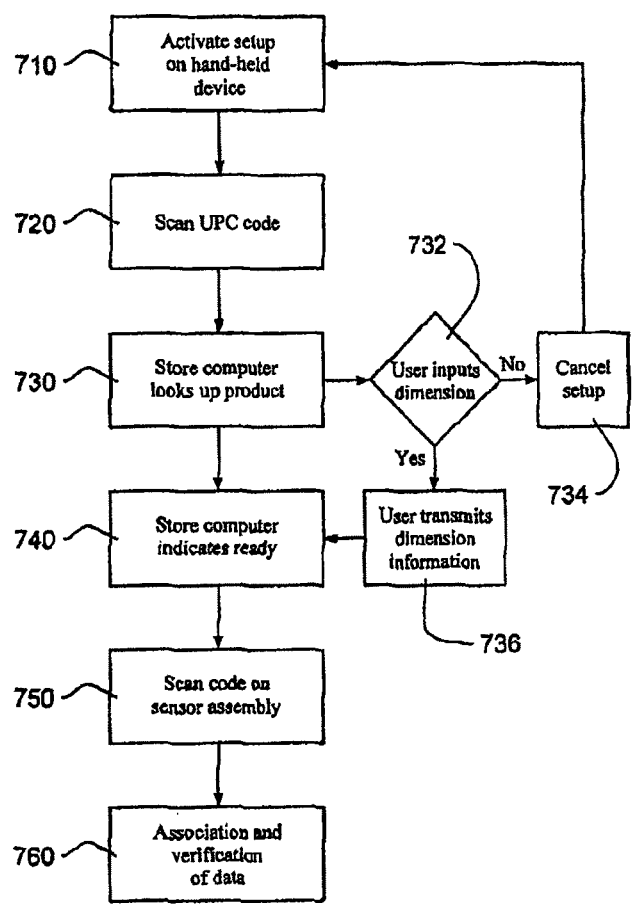
FIG. 8 illustrates a flow chart demonstrating an alternative method of updating the association of a particular product with a particular shelf location.

FIG. 8 illustrates an alternative method of associating a controller with a product. In step 710, a hand-held device is activated to indicate that the user is about to setup controller 55. The activation includes the transmission of a signal to a store computer 90.

In step 720, the hand-held device is used to scan the UPC code of the product and transmit the information to the store computer 90. Next, in step 730, the store computer 90 looks to see if a product dimension is listed for that scanned UPC code. In the event that no dimension is associated with the UPC code, the computer, in step 732, transmits a signal to the hand-held device requesting the user to input the appropriate product dimension.

If the user does not know the product dimension or cannot measure the dimension, the user can cancel the setup and start over with a new product in step 734.

If the user does know the dimension or is able to measure the dimension, the user then enters the dimension and transmits the information to the store computer 90 in step 736. After the product dimension is determined, in step 740, the store computer 90 sends a signal to the hand held device indicating that the user should proceed.

Next, in step 750, the user scans the serial number of the controller 55. Preferably, the serial number of the controller 55 is printed in a black/white code on a sticker mounted to the sensor assembly 30. After scanning the serial number, the hand held device transmits the serial number to the store computer 90.

Then, in step 760, the store computer 90 associates the UPC code of the product with the serial number of the controller 55. The store computer 90 then signals the hand held device that the setup for the device is complete. To avoid potential communication problems during setup, all communications between the hand-held device and the store computer 90 can include a code representing the hand-held device.

In an alternative embodiment, the method of associating a product with a controller 55 could be done without sending a signal to the store computer 90. In this embodiment, the data would be uploaded from the hand-held device once the user had associated the various controllers with the various products.

As can be appreciated, numerous methods of product association with a controller 55 are possible, thus the above methods are illustrative.

A system for determining the location of the pusher with an indicia strip and sensor has been described. Numerous additional methods exist for measuring the distance between the front or rear of a shelf and the pusher or the final product in a facing of products. Based on this distance, and understanding the dimension of the products in the facing, a simple calculation can be performed to determine the number of products in the facing. This calculation can be performed by a microprocessor, store computer, controller or some other processing device which has received the information regarding the distance between the shelf front and the last product in a facing. Moreover, the pusher assembly has been described to include a spring. However, some other biasing method, such as gravity or magnetism, would also work to move the pusher and the product forward.

Figure 9:
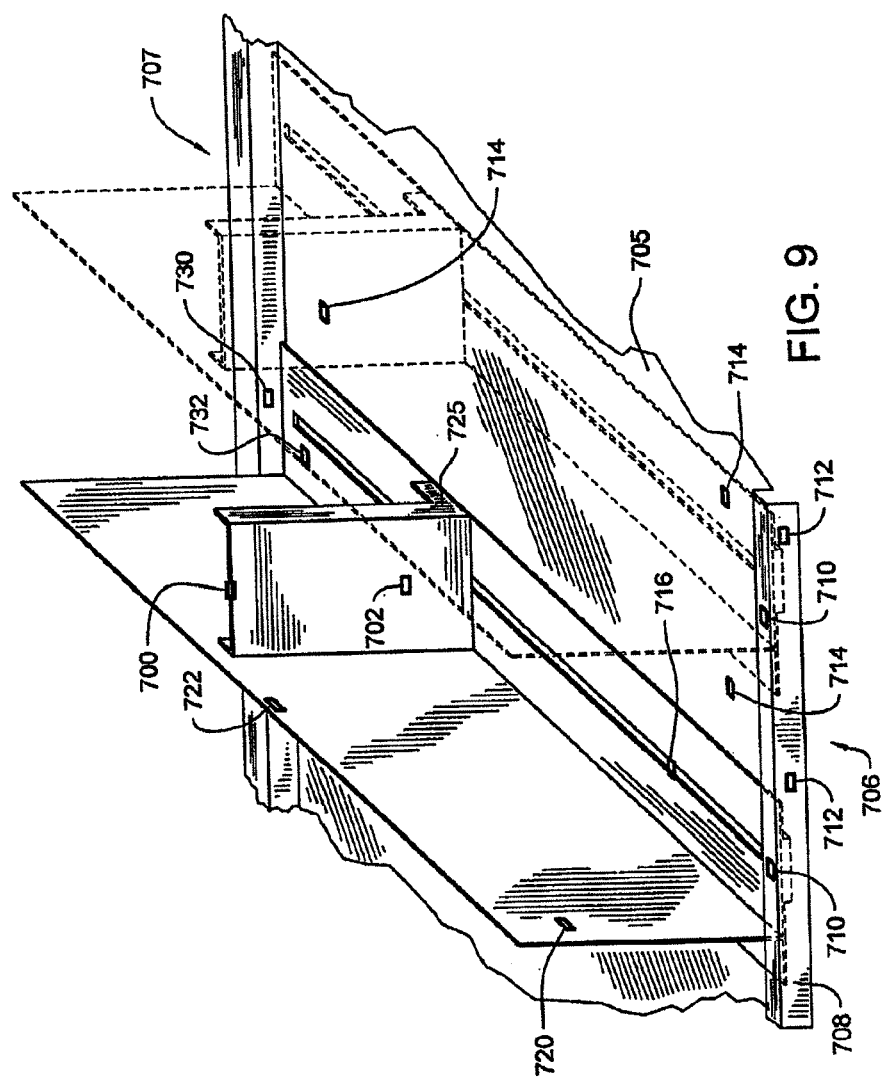
FIG. 9 illustrates an isometric view of an alternative embodiment of the present invention.

In an embodiment of the present invention, as illustrated in FIG. 9, the use of transmitted light or other signal, such as a radio frequency signal, that is passed between a position near the back of the facing of products and a stationary position can be used to measure the distance between the front of the shelf and the pusher. In one embodiment, a transmitter 700 or 702 is incorporated into a pusher 725. The transmitter generates a light or other signal that can be transmitted on command, periodically or continuously. A light emitting diode (LED), radio frequency or ultrasonic generator or other signal generation device can be used to generate the light or signal.

A corresponding receiver is incorporated into a location that is stationary in relation to the pusher 725. The receiver 712 can be incorporated into a front rail or another location at or near the front of the shelf, a receiver 730 can be incorporated into a rear rail or other location at or near the rear of the shelf, it also can be incorporated into the floor of the shelf, the track of the pusher, the roof of the shelf or the divider wall. The receiver detects the signal that is sent from the transmitter. For example, a LED may radiate light having a particular intensity. A phototransistor acting as a receiver detects the light signals being emitted from the LED. The sensitivity of the phototransistor and the intensity of the LED may be adjusted by the microprocessor in order to adjust the overall sensitivity of the optical components. In an embodiment, the adjustment can be done remotely. Thus, the transmitter can communicate in a wireless fashion with the receiver through RF, IR or other known means such as magnetic fields, electrical fields, sound waves and the like.

The transmitter and receiver may be in communication with a controller that tracks the time of sending and receiving. This data can be provided to a processing device such as a microprocessor or a store computer, thus in this embodiment the pusher code would include the time interval between sending and receiving. Information regarding the time at which the signal was sent and the time at which it was received may be utilized by a processing device to determine the time between the transmission and the receipt of the signal. Based on this length of time, the processing device can calculate the distance between the transmitter and the receiver. Knowing the dimensions of the shelf, the pusher system and the components thereof, this distance can then be translated into the distance between the front side 6 of the shelf and the face of the pusher 25 that is biased against the back of the facing of products. Such a translation is well known and within the knowledge of one of ordinary skill. If the relevant dimension of the products in the facing is known, the processing device can then calculate the number of products in the facing based on the known dimension of the products.

In an alternative embodiment, the transmitter and the receiver switch locations. The transmitter can be placed at or near the front or the rear of the shelf or other relatively stationary position and the receiver can be placed on or near the pusher. In an alternative embodiment, the transmitter and the receiver can be incorporated into the same device which merely bounces a signal off a stationary position. For example, a reflector can be placed on the pusher and a transmitter/receiver using a laser, or some other light source, can determine the distance between the reflector and the transmitter/receiver based on the time of travel. Examples of possible transmitter/receivers include, but are not limited to, optical displacement measurement sensors and reflective laser sensors. As can be appreciated, if a transmitter and a receiver are used to determine distance, it is preferable that the location of either the part that is stationary be located near the front side or the rear side of the shelf so as to make the distance calculation simpler and to avoid problems with symmetric distances on both sides of the stationary unit mounted to the shelf. For example, mounting a transmitter halfway between the front and rear of the shelf would make determining the location of the pusher more complicated because there would be two possible locations for a given distance.

In an embodiment, depicted in FIG. 9, a transmitter (700, 702) is incorporated into a pusher 725. The transmitter is a light emitting diode and is located at any location on the pusher 725 that allows the transmitter to function. The transmitter can be located at the top of the pusher 725 at 700 or at the base of the pusher 725 at 702 or at other locations on the pusher 725.

A receiver is located at a position that is fixed in relation to the movement of the pusher 725. The receiver may be a phototransistor and can be located on the front of the shelf 705, such as receiver 710 or on a front rail 708 connected to the front of the shelf, such as receiver 712. The receiver can further be located on the floor of the shelf at any number of positions as represented by 714, on the floor of the pusher track at 716 or at a location above the shelf 705 such as on another shelf (not shown) mounted above the shelf 705. The receiver can be located on the divider wall at 720 or 722 or other location on the divider wall. The receiver also can be located near the rear side 707 at 730 or at 732. Preferably, the receiver will be mounted near the either front side 706 or the rear side 707 so as to make distance calculation simpler.

The receiver and the transmitter can also switch locations. The pusher can incorporate a receiver, and a transmitter can be incorporated at any of the locations 710-732 as well as in any other location that is fixed in relation to the movement of the pusher. Preferably, however, the location of the transmitter will be near either the front side 706 or the rear side 707 so as to make calculation of distance simpler.

In an embodiment, the transmitter is located at 700 and the receiver is located at 710. When the pusher moves backward or forward on the shelf, the transmitter 700, mounted on the pusher 725, moves with the pusher 725. When the pusher 725 is located near the back of the shelf, a signal will take a certain amount of time to travel from the transmitter 700 to the receiver 710. When the pusher 725 is located closer to the front of the shelf, a signal will take less time to travel from the transmitter 700 to the receiver 710. Data regarding the transmission and receipt of the signal (i.e. the pusher code) is sent to a microprocessor or other processing device. The processing device determines the amount of time it takes the signal to travel from the transmitter to the receiver. Knowing the signal travel speed, the processing device determines the distance between the transmitter and the receiver.

With an understanding of the location of the transmitter in relation to the products and an understanding of the location of the receiver in relation to the front or back of the shelf, the processing device will be able to determine the distance between the pusher and the front of the shelf. Using the dimension of the products, the processing device can then determine the number of products in the facing. The light emitting diode or other transmitter can be set to function periodically, continuously or on command from a remote location.

Alternatively, the processing device may control both the LED and phototransistor. The processing device may record a time T1 in which the microprocessor issues a command to generate a pulse from the LED and a time T2 in which the light signal is detected by the phototransistor. Both of these times T1 and T2 may be stored in memory and used to determine the number of product in the facing, using the above described relationships.

In an alternative sensing environment, a capacitive proximity sensor may be utilized to measure the distance between the front of the shelf and the pusher or the final product in a facing of products. The capacitive proximity sensor detects the pusher which acts as a target for the capacitive proximity sensor. The capacitive proximity sensor generates an electrostatic field which is directed at the target. As the distance of the pusher changes with respect to the location of the capacitive proximity sensor, the capacitive proximity sensor reacts to the changes in capacitance caused by the movement of the pusher in relation to the sensor.

Additional sensing environments may also include the use of magnetic proximity sensor or an inductive proximity sensor. In both sensing environments, the proximity sensors may be utilized to measure the distance between the front of the shelf and the pusher or the final product in a facing of product.

An inductive proximity sensor is useful in detection of metal targets as the inductive proximity sensor uses an induced field to sense the target object. In an embodiment with an inductive proximity sensor, the proximity of a pusher in relation to the inductive proximity sensor can be detected as the distance of the pusher changes with respect to the location of the inductive proximity sensor. Similarly, a magnetic proximity sensor based on the Hall Effect principle may also be utilized to sense the location of the pusher.

In an embodiment, a proximity sensor could be mounted near the rear side 707, the proximity sensor configured to sense the distance to the pusher 25. A processing device, such as the store computer or microprocessor, could determine the distance between the pusher 725 and the front side 706 and use that distance to determine how much product was left on the shelf.

In an alternative embodiment, a Radio Frequency Identifying Transponder ("RFIT") having a unique identity code is mounted to the pusher 725. A sensor assembly including a transmitter/receiver can be mounted on the rear side 707 of the shelf 705. The transmitter/receiver, when activated, transmits an activation signal that activates the RFIT. The RFIT, upon activation, transmits a responsive signal that includes the unique identifying code. The transmitter/receiver receives the responsive signal from the RFIT. The sensor assembly is equipped with a timing device and measures the time between the initial transmission of the signal from the transmitter/receiver until the receipt of the responsive signal from the RFIT. In an embodiment, a controller can initiate the transmission of the signal and record the receipt of the responsive signal into memory. The controller is also equipped with a timing device to measure the delay. The delay in time can be used to calculate the distance between the transmitter/receiver and the RFIT. In an embodiment, the controller can calculate the distance and provide a pusher code that includes the distance. Alternatively, the pusher code will include data regarding the delay and the pusher code will be forwarded to a processing device for distance calculation. As discussed above, the distance between the pusher 25 and the transmitter/receiver can be used to calculate the amount of product remaining in the shelf.

An advantage of using an RFIT in combination with a transmitter/receiver is that it can be easily retro-fitted to existing systems. As the RFIT does not require internal power, this embodiment eliminates the need to provide a powered device on the pusher 725. The transmitter/receiver, however, is powered. Preferably, the transmitter/receiver transmits a focused or low powered signal so that only the RFIT associated with the transmitter/receiver is activated. Alternatively, the transmitter/receiver ignores responsive signals from RFIT's that do not include the proper unique identifying code.

In another alternative embodiment, a low powered, one-chip radar sensor may be used to determine the distance between the radar sensor and the pusher 725. Preferably the radar sensor may be mounted near the rear side 707 so as to make distance determinations less complex.

In an alternative embodiment of the present invention, a device for measuring the tension of the spring used for pushing the products can be used. The tension on the spring will, at least in part, be dependent upon the number of products in front of the pusher. As more products are placed in front of the pusher, the spring either further compresses or expands. In the case of a coil spring, as more products are placed in front of the pusher, the two ends of the spring move further apart and the spring further uncoils. As the spring uncoils, the amount of tension or pressure within the remaining coil of the spring increases. By measuring the tension of the spring, the length of the spring that is uncoiled can be determined.

The spring tension measuring device can incorporate a processing device or can transmit the information it measures to a microprocessor or other processing device. With a previous understanding of how the tension on the spring relates to the length of the spring, the processing device can determine the amount or length of spring that is uncoiled. For example, if the coil spring has a fixed spring constant, "k", then the formula $F=-kX$ can be used to calculate the length of spring that is uncoiled. This information can be used to determine the distance between the front of the shelf and the pusher. Understanding the dimensions of the products, the computing device can then determine the number of products in a facing.

A spring tension measuring device may include a force measuring unit that includes, but is not limited to, strain gauges, tensiometers, torque transducers or some other force measuring device to determine the tension exerted on the coil spring. The force measuring unit is preferably connected to a controller, where the controller is configured to convert the data from the force measuring unit into a force value. The controller could then transmit the force value to a processing device. In this embodiment, the pusher code would include a force value. Numerous other methods of measuring spring tension will be apparent to one of skill in the art and are within the scope of the invention.

In an alternative embodiment of the present invention, the number of products remaining in a particular facing is determined in part through the use of one or more transmitter(s) and receiver(s) placed on opposite lateral sides of the products. In one embodiment the transmitters or receivers may be placed on divider walls that separate facings of products. In one embodiment, a series of transmitters is incorporated into or onto the base of a divider wall. A series of receivers in incorporated into or onto the other side of the divider wall. In this manner, when products are on a shelf, those products that are being pushed are between the transmitters on one divider wall and the receivers on another divider wall.

Periodically, when prompted, or continuously, the transmitter sends a signal. If there is no product between the transmitter and the receiver, the receiver will receive the signal. If there is a product between the transmitter and the receiver, the product will block the signal, and the signal will not be received by the receiver.

A microprocessor receives the information regarding whether or not the various receivers received a signal. Based on this information, the microprocessor can determine the approximate distance between the front of the facing and the last product in the facing. With an understanding of the dimension of the products, the information regarding receipt and non-receipt of signals can be translated into an understanding of the approximate number of products in the particular facing. In an embodiment, one transmitter and one receiver is used to indicate that a particular shelf is running low on the associated product. In this embodiment, the location of the transmitter/receiver is preferably closer to the front side 706 then the rear side 707. Preferably a controller with a unique identifying code is associated with the transmitter and receiver so that the unique identifying code can be associated with the product.

The transmitter and the receiver can be incorporated into the same device which attempts to bounce a signal off a predetermined target affixed to a particular location. If the signal bounces as expected, it indicates that there is no product between the transmitter and the target location. If the signal does not bounce as expected, a product exists between the transmitter and the target location.

Figure 10:
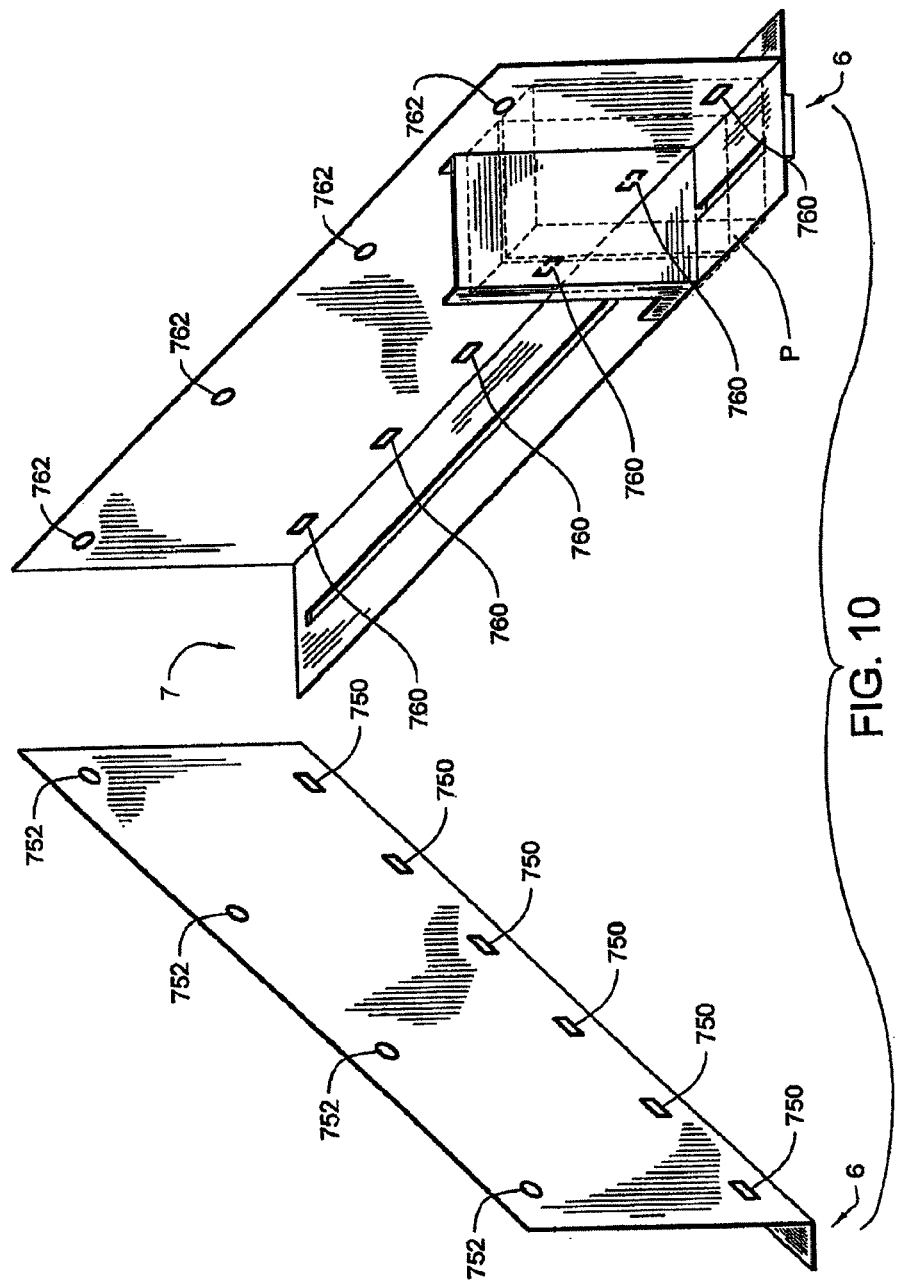
FIG. 10 illustrates a partially exploded view of an alternative embodiment of the present invention.

FIG. 10 depicts a partially exploded view of an alternative embodiment of a shelf and pusher assembly, the shelf having divider walls. As depicted in FIG. 10, several transmitters 750 are placed on the left side of the divider wall toward the bottom. The transmitters also can be placed higher on the divider wall as shown at 752. Corresponding receivers 760 are placed on the right side of the divider wall toward the bottom. These receivers also can be placed higher on the divider wall as shown at 762. The receivers and the transmitters are positioned such that an unobstructed signal can be sent from a transmitter and received by a corresponding receiver. When product, such as product P, is positioned in front of a pusher, it can obstruct the signal sent from the transmitter. As shown in FIG. 10, product P (shown in dashed lines) will prevent the signal from reaching the receiver 760 nearest the front side 6 of the shelf. The receivers that are positioned further back than product P will receive the signals sent to them. A microprocessor receives the information regarding whether each of the receivers 760 received signals. Based on this information, the microprocessor can determine the distance between the front of the shelf and the last product in a particular facing. With an understanding of the width of each product, the microprocessor can determine the number of products in a particular facing.

In one embodiment of the present invention, the pusher contacts a variety of sensing devices as it moves backward or forward on a shelf. Sensing devices are placed on a surface below, above, or on the sides of a pusher. These sensing devices include devices that are mechanical, electrical and eletromechanical, optical and magnetic, and can include spring loaded latches, electrical contacts, light emitting diodes or metal wires or other sensors such as linear position sensors.

As the pusher moves backward or forward on a shelf, it interacts with the sensing devices. The pusher may interact with the devices through the mechanical contact of the pusher and the devices. The pusher may also be equipped with a separate sensing device that interacts with the stationary sensing devices as the pusher moves backward or forward.

Information regarding the interaction between the pusher and the sensing devices (i.e. the pusher code) is sent to a processing device. Based on the determination of the devices with which the pusher interacted, the processing device can determine the approximate position of the pusher in relation to the front of the shelf. With an understanding of product data, such as the dimension of the product, a processing device can then determine the approximate number of products that are in the particular facing related to the pusher and the sensing devices.

Figure 11:
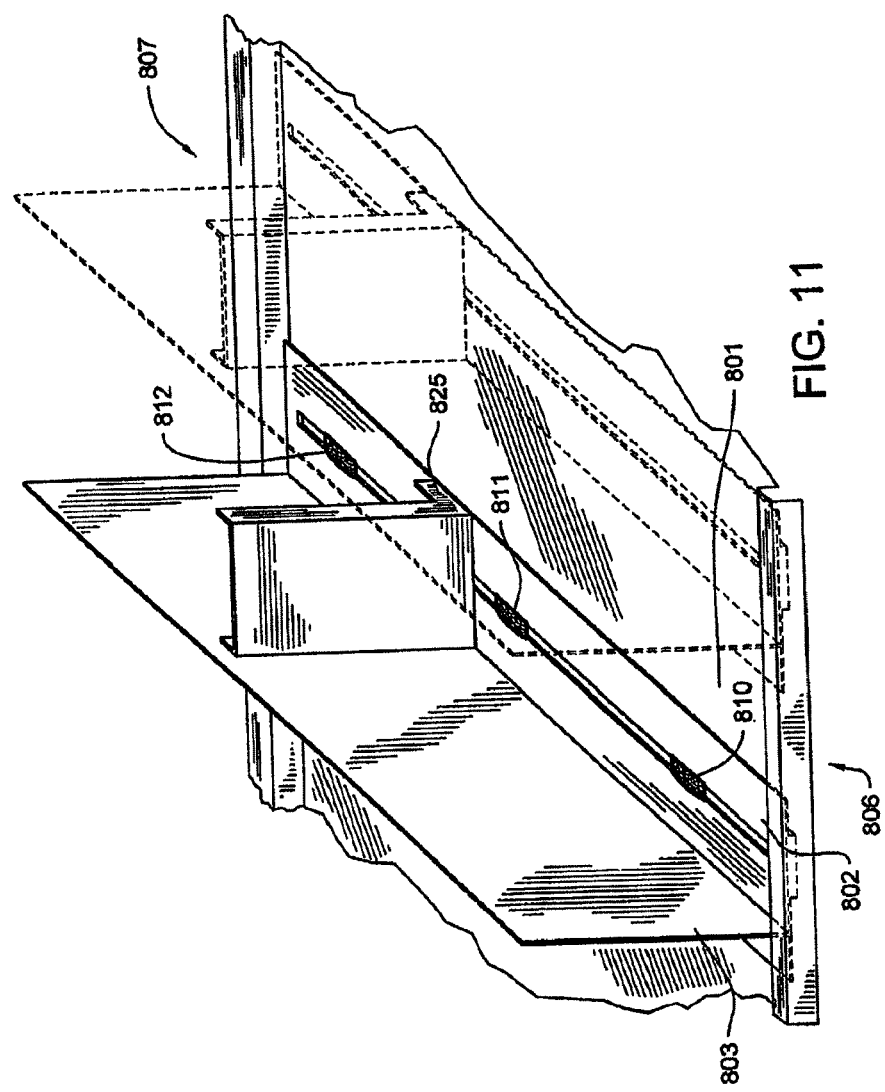
FIG. 11 illustrate an isometric view of an alternative embodiment of the present invention.

In an embodiment, as depicted in FIG. 11, sensing devices 810, 811 and 812 are incorporated into the base of the track on which the products rest. When products are resting directly over the switches, the sensing devices are closed. As products are removed and the pusher 825 travels forward, the sensing devices that are to the rear of the pusher 825 are released and open. A controller determines which sensing devices are open or closed. Based on this information, a processing device can determine the approximate distance between the pusher 825 and the front side 806 of the shelf. Knowing the dimension of the products, the processing device can determine the number of products in a particular facing.

Figure 12:
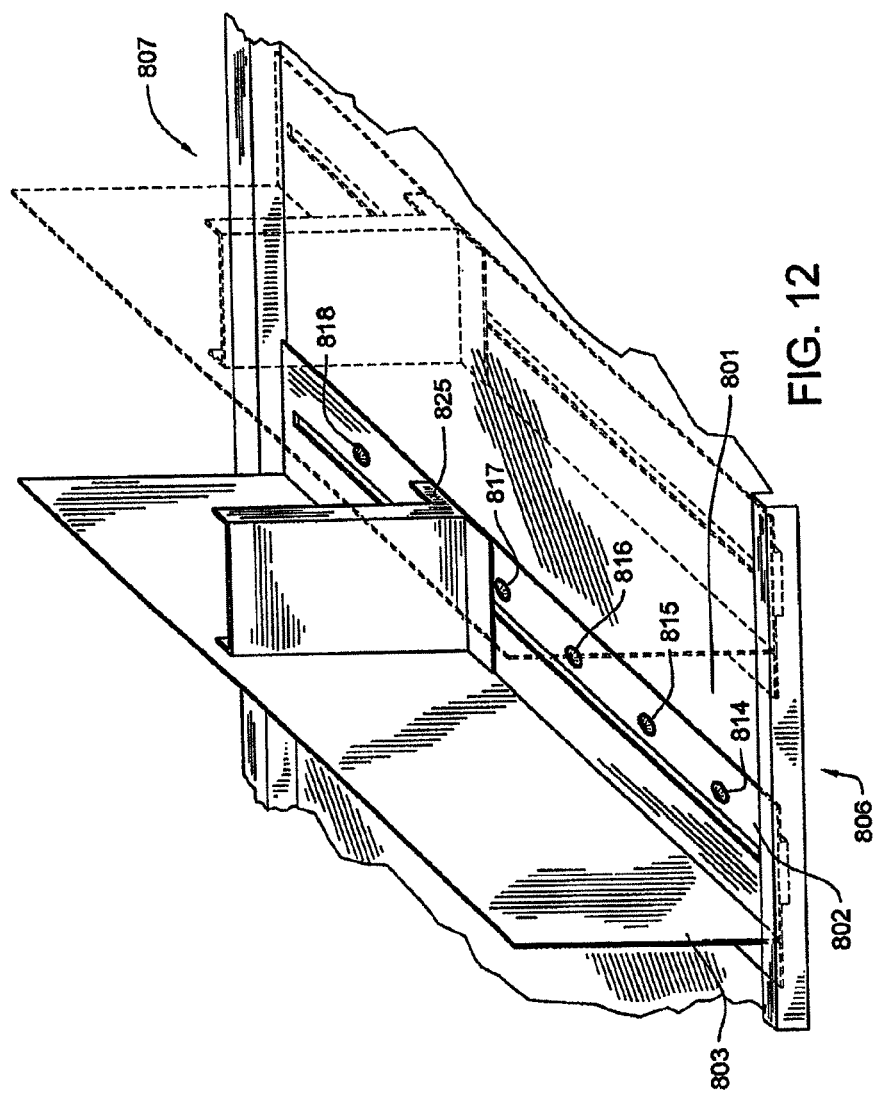
FIG. 12 illustrates an isometric view of another alternative embodiment of the present invention.

In an alternative embodiment, as depicted in FIG. 12, sensing devices 814, 815, 816, 817, and 818 are placed on the pusher track 802. A separate contact (not shown) is placed on the bottom of the pusher 825. The contact on the pusher 825 is configured such that when the contact on the pusher 825 is adjacent to a sensing device mounted on the pusher track 802, the sensing device on the pusher track 802 is activated. When the sensing device is activated, a signal is sent to a processing device, the signal providing information as to which sensing devices has been activated. Based on this information, the processing devise can determine the approximate distance of the pusher from the front of the shelf. Knowing additional data about the products, such as the product dimensions, the processing device can determine the number of products in a particular facing.

For example, while contact 816 is activated, the processing device can determine that the amount product is equal to the amount of product that can fit in the space between the contact 816 and the front side 806 of the shelf 801. In the event that the contact 816 is activated and then deactivated, the processing device can determine that the pusher 825 is between contacts 815 and 817. This, therefore, provides an approximate position of the pusher 825 and the approximate position can be used to determine the approximate quantity of product remaining on the shelf. In an embodiment, the contacts can be spaced closer together near the front side 806 of the shelf 801 so that more accurate measurements can be taken as the amount of product on the shelf decreases. Alternatively, enough contacts can be used to provide a relatively precise location of the pusher 825.

Figure 13:
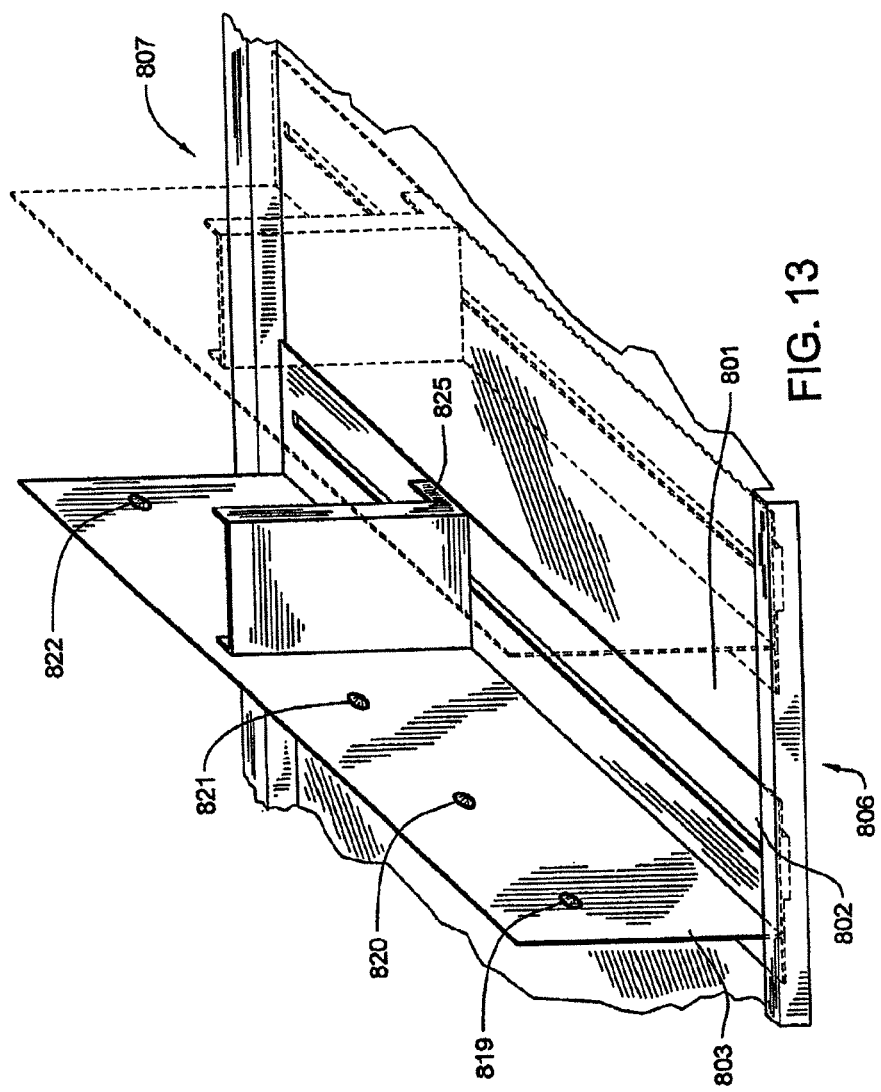
FIG. 13 illustrates an isometric view of yet another alternative embodiment of the present invention.

In an alternative embodiment, as depicted in FIG. 13, the contacts 819, 820, 821 and 822 can be mounted to the divider wall 803. As with contacts 814-818, the activation of one of the contacts 819-822 indicates the location or the approximate location of the pusher 825. Locating the contacts along the divider wall 803 can help prevent problems with accidental activation of the contacts by product on the shelf. As with the contacts mounted in the pusher track 802, the distance between contacts 819-822 can be non-uniform so that greater precision is provided as the shelf becomes less full.

Figure 14:
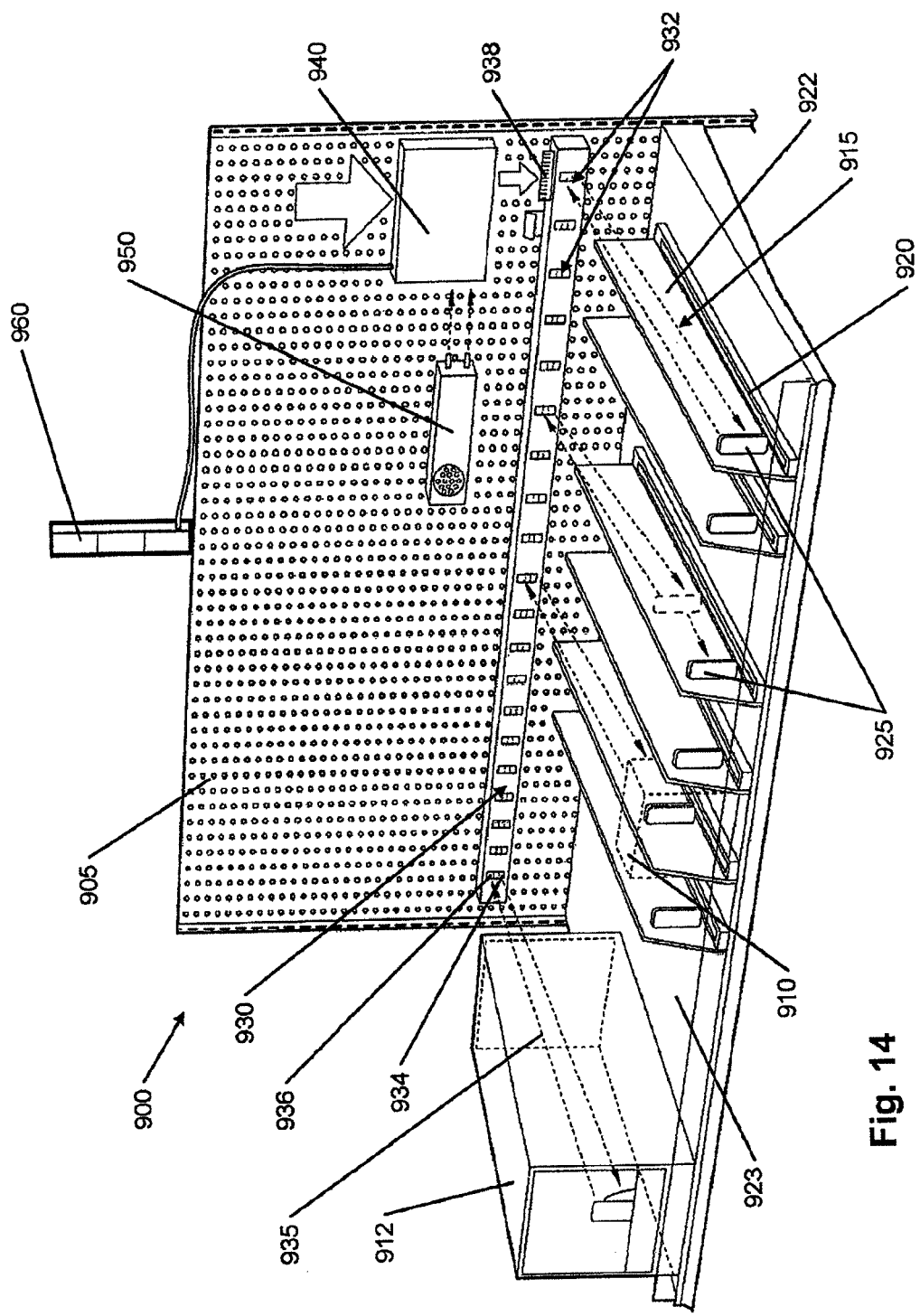
FIG. 14 illustrates an isometric view of yet another alternative embodiment of the present invention.

In an alternative embodiment similar to the embodiments described above, a shelf management system 900 for detecting and communicating the position of a pusher assembly on a shelf is depicted in FIG. 14. The shelf management system 900 may include a pusher assembly 915, a light assembly, and a control module 940. The pusher assembly 915, light assembly, and control module 940 may all be secured to a gondola wall 905 or similar structure that holds a product 910. The product 910 may be aligned or arranged along the pusher assembly 915. Additionally, the product 910 may be contained in separate product container box 912 as illustrated in FIG. 14.

As depicted, the pusher assembly 915 may include a biasing mechanism such as a coil spring. The pusher assembly 915 may include an integral divider wall 922 and a floor section 920 on one or both sides of the divider wall 922. The coil spring may be operatively connected or associated with a pusher 925 and can be used to urge the pusher 925, and the associated product 910, toward the front side of the shelf. The pusher assembly 915 may be modular and can include a divider wall or an additional floor section that fits or mates in place. Additionally, since the present invention has no connection to the pusher assembly 915, the present invention may work with any product shelving system.

The light assembly may include a light channel 930 and a light transceiver 932. The light transceiver 932 may be one of many light transceivers located on the light channel 930. The light transceiver 932 may be located behind the product 910 to be measured on a shelf. The light transceiver 932 may consist of a light transmitter 934 and a light sensor 936. The light transmitter 934 is configured to send a light signal 935 towards the pusher 925, while the light sensor 936 is configured to receive the light signal 935 from the pusher 925. In an alternative embodiment, the light transmitter 934 and the light sensor 936 may be the same component as part of the light transceiver 932. The spacing of the light transmitters 934 and the light sensors 936 on the light channel 930 may ensure that at least one light transmitter 934 and one light sensor 936 is focused on or sees every pusher 925. Additionally, the light channel 930 may include an electronic connection 938.

Without departing from this invention, the light assembly may utilize one of many different types of light, with one type of light being utilized is in the "infrared spectrum." For example, the light assembly could include an infrared (IR) transceiver, wherein the IR transceiver may consist of an IR transmitter and an IR sensor.

As illustrated in FIG. 14, the shelf management system 900 may also include a control module 940. The control module 940 may align with the electronic connection 938 on the light channel 930 and lock into place. The control module 940 may include a microcomputer. Additionally, the control module 930 may have internal wireless capability without departing from the invention.

As illustrated in FIG. 14, the product 910 may be pushed forward by the spring-urged pusher 925 or pusher paddle in the shelf management system 900. As the product 910 is pushed forward, a light signal 935 is transmitted from the light transmitter 934 found on the light channel 930. The light signal 935 may then reflect off the back of the pusher paddle 925 or the product 910 and then back to the light sensors 936. This information may then be relayed to the control module 940, thereby measuring the distance to the pusher 925 or the product 910. The light transceiver 932 may be controlled by the control module 940 and microcomputer connected to the light transceiver 932. The process of sending the light signal 935 to and from the pusher paddle 925 or the product 910 may be taken on a continuous or near continuous basis, such as a fraction of a second, or may be taken on a periodic basis such as a second, or 5 seconds.

In an aspect of the invention, the microcomputer in the control module 940 may compare the most current position of the pusher 925 with a previous position of the pusher. The difference in positions of the pusher 925 may result in the microcomputer determining a condition of the shelf management system 900. First, the microcomputer may determine that no activity has occurred since the last reading. Second, the microcomputer may determine that a normal shopping instance has occurred, and if so how many product packages are still being urged by the pusher 925. Third, if more than a predetermined number of product packages have been removed in less than a predetermined amount of time, the microcomputer may determine that a potential theft situation is in progress. Another condition that may be communicated is a low product condition. For example, the microcomputer may determine a low product condition if any pusher location is empty of product packages or less than a predetermined number of product packages are still being urged by the pusher 925.

As illustrated in FIG. 14, without departing from the present invention, the shelf management system may include a local audio box 950. Any of the conditions described above may be communicated by the microcomputer to the local audio box 950 remotely via wired or wireless communication devices to a remote computer, a store public announcement system, a cell phone, a pager, or a remote annunciator. Additionally, without departing from the present invention, the shelf management system may include a light annunciator 960. Any of the conditions described above may be communicated by the microcomputer to the light annunciator 960 remotely via wired or wireless means to a remote computer, a store public announcement system, a cell phone, a pager, or a remote annunciator. An internal wireless capability of the control module 940 may wirelessly transmit signals to/from a remote location to indicate the condition of the shelf management system.

Additionally, for the shelf system 900 illustrated in FIG. 14, the number of products aligned on the shelf could be measured. In such an embodiment, the position of the pusher 925 could be used to determine the amount of product 910 on the shelf without the need to manually count the product. For example, the light transceiver 932 transmits the light signal 935 to the pusher 925 or the product 910. The light signal 935 may then be reflected back to the light transceiver 932 to determine the location of the pusher 925 by measuring and calculating the time to receive the light signal 935 at the light transceiver 932. When one product is removed, for example by a purchaser, the time to receive the light signal 935 back at the light transceiver 932 increases a particular amount. Based on the dimensions of the product 910, specifically the thickness of the product, the control module can calculate how many products have been removed from the shelf by an algorithm of how fast the light signal is traveling back to the light transceiver 932. The control module also can calculate the number of products that remain on the shelf in front of the pusher using in part information regarding the shelf dimensions, including the shelf depth. Additionally, the system can be used in an inventory management mode to help the retailer determine the number of products for inventory purposes and restocking in low-stock or no-stock situations. Without departing from this invention, a user may input the thickness of the product 910 as a setting into the control module 940 during the set-up or loading of the product 910 on the shelf. Additionally, without departing from this invention, the thickness of the product 910 may be determined by the control module 940 after taking a number of different readings from the system, such as a smart or learning system for determining the thickness of the product 910.

The thickness of the product also may be determined by the system when products are initially stocked in the system. The light transceiver 932 transmits the light signal 935 to the pusher 925 when no product is on the shelf. The light signal 935 may then be reflected back to the light transceiver 932 to determine the location of the pusher 925 by measuring and calculating the time to receive the light signal 935 at the light transceiver 932. When one product is added to the shelf, for example by an employee, the time to receive the light signal 935 back at the light transceiver 932 decreases a particular amount. Based on this decrease in the amount of time, the control module can calculate the thickness of the product.

In an alternative embodiment similar to the embodiments described above, FIGS. 15*a* and 15*b* illustrate another shelf management system 1000 for detecting and communicating the position of a pusher assembly on a shelf similar to the shelf management system 900 described above and illustrated in FIG. 14. The shelf management system 1000 may include a pusher assembly 1015, a laser assembly, and a control module 1040. The pusher assembly 1015, laser assembly, and control module 1040 may all be secured to a gondola wall 1005 or similar structure that holds a product 1010. The product 1010 may be aligned or arranged along the pusher assembly 1015. Additionally, the product 1010 may be contained in separate product container box 1012 as illustrated in FIG. 15*a*.

The pusher assembly 1015 may include a biasing mechanism such as a sheet coil spring. The pusher assembly 1015 may include an integral divider wall 1022 and a floor section 1020 on one or both sides of the divider wall 1022. The sheet coil spring may be operatively connected to a pusher 1025 and can be used to urge the pusher 1025, and the associated product 1010, toward the front side of the shelf. The pusher assembly 1015 may be modular and can include a divider wall or an additional floor section that fits or mates in place.

The laser assembly may include a rear reflector strip 1030 and a single light transceiver or laser scanner 1032. The laser scanner 1032 may emit or transmit a laser light or output beam 1035. The laser scanner 1032 may include a moving mirror or rotating mirror (not shown) located within or associated with the laser scanner 1032. Without departing from this invention, in place of or in addition to the moving mirror, the laser scanner 1032 may include an integrated circuit mirror technology, such as microelectromechanical systems (MEMS) mirrors used in the Digital Light Projector (DLP) field, wherein an array of tiny microscopic mirrors are used to direct and alter the output beam 1035. The moving mirror may rotate within the laser scanner to alter the output beam 1035 being emitted from the laser scanner 1032. The transmission and angles of the output beam 1035 may also be altered by other various ways. The moving mirror may be controlled by a microcomputer within the control module 1040. The moving mirror may direct the output beam 1035 from the laser scanner 1032 at various angles, thereby creating a swept beam 1037. The swept beam 1037 may be directed along the rear reflector strip. An example of a portion of the swept beam 1037 is illustrated in FIG. 15*b*. The process of transmitting the swept beam 1037 from the laser scanner 1032 to and from the pusher paddle 1025 or the product 1010 may be taken on a continuous or near continuous basis, such as a fraction of a second, a second, or 5 seconds.

Figure 15A:
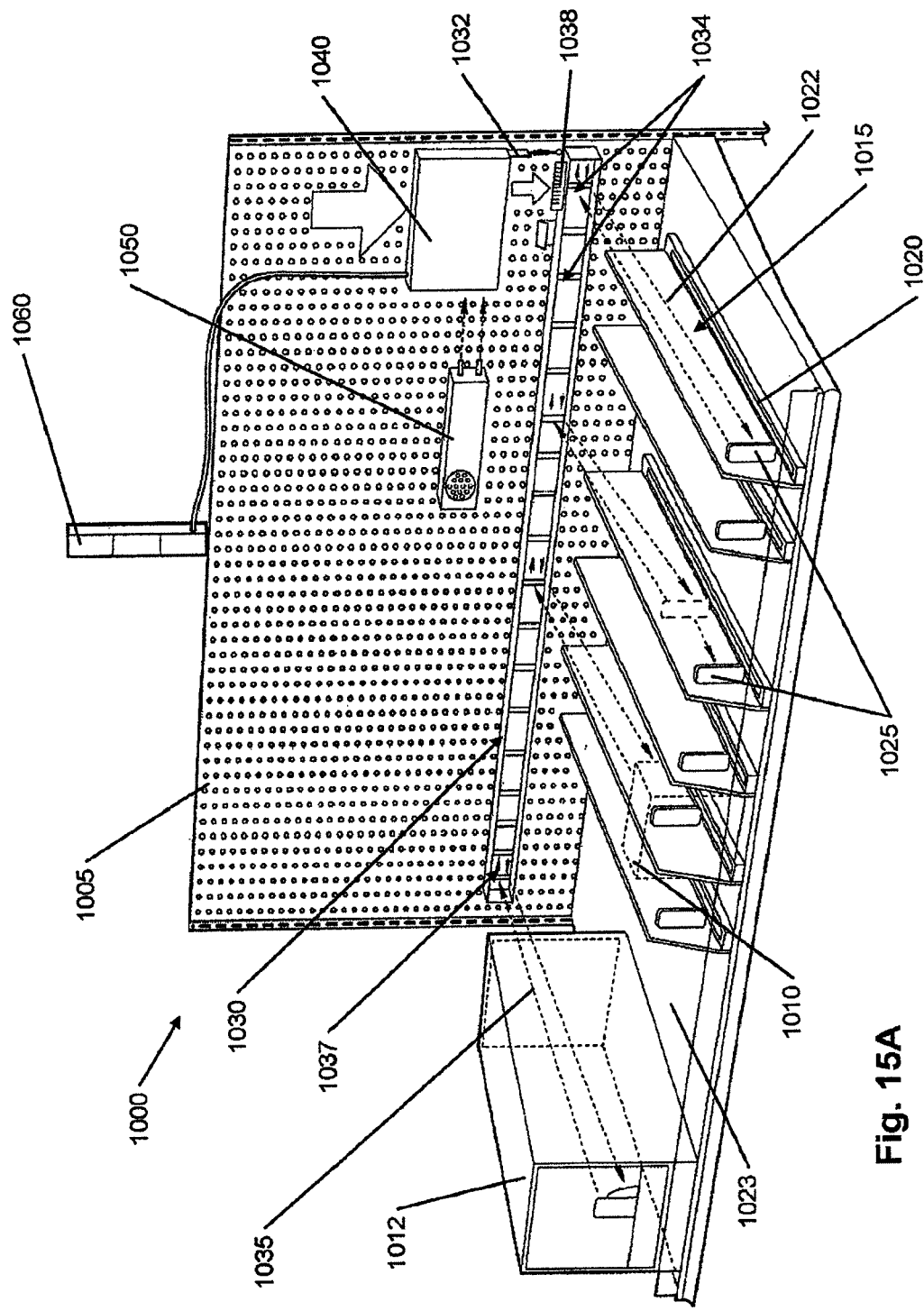
FIG. 15a illustrates an isometric view of yet another alternative embodiment of the present invention.
Figure 15B:
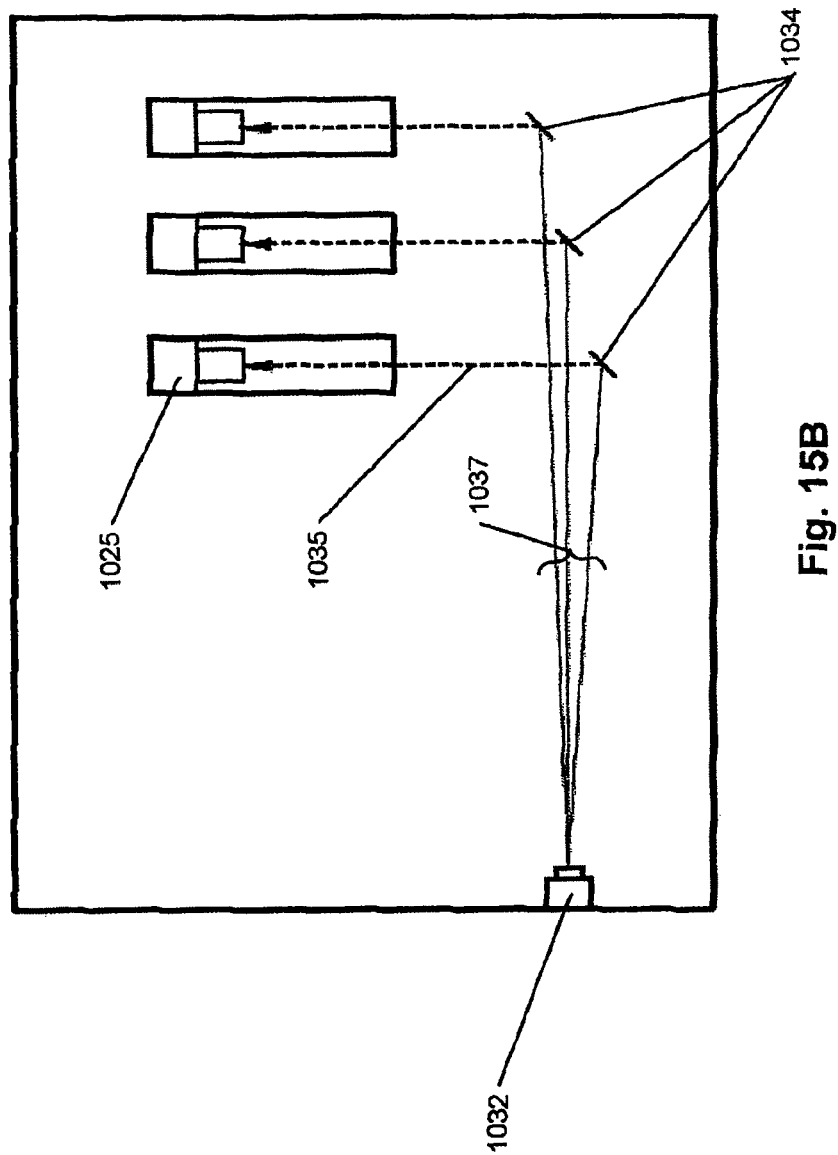

As further illustrated in FIGS. 15*a* and 15*b*, the rear reflector strip 1030 may include piece-wise linear or smooth fixed mirrors 1034. The fixed mirrors 1034 may be positioned along the rear reflector strip 1030. The fixed mirrors 1034 may be along, parallel or near-parallel to the path of the swept beam 1037 such that each individual fixed mirror 1034 intercepts the output beam 1035 along its swept path (as shown in FIG. 15*b*). The fixed mirrors 1034 may also be located along the rear reflector strip 1034 and located behind and essentially perpendicular to the direction of travel of the pushers 1025 in the shelf management system 1000. Additionally, the rear reflector strip 1030 may include an electronic connection 1038.

As illustrated in FIG. 15*a*, the shelf management system 1000 may also include a control module 1040. The control module 1040 may align with the electronic connection 1038 on the rear reflector strip 1030 and lock into place. The control module 1040 may include a microcomputer. Additionally, the control module 1040 may have internal wireless capability without departing from the invention.

As illustrated in FIGS. 15*a* and 15*b*, the product 1010 may be pushed forward by the spring-urged pusher 1025 or pusher paddle in the shelf management system 1000. As the product 1010 is pushed forward, the laser scanner 1032 directs the swept beam 1037 along the rear reflector strip 1030 at one of the fixed mirrors 1034. The fixed mirror 1034 may then redirect the output beam 1035 at a preferred angle (such as a right angle) to the altered path of the output beam 1035 such that the fixed mirror 1034 essentially directs the output beam 1035 to the back of the pusher 1025. The output beam 1035 may then reflect off the back of the pusher 1025 wherein the output beam 1035 then returns back to the laser scanner 1032 for analysis. This information may then be relayed to the control module 1040. The laser scanner 1032 may be configured to measure the distance to the pusher 1025. The laser scanner 1032 may be controlled by the control module 1040 and the microcomputer.

The microcomputer in the control module 1040 may compare the most current position of the pusher 1025 with a previous position. The difference in positions of the pusher 1025 may result in the microcomputer determining a condition of the shelf management system 1000. First, the microcomputer may determine that no activity has occurred since the last reading. Second, the microcomputer may determine that a normal shopping instance has occurred, and if so how many product packages are still being urged by the pusher 1025. Third, if more than a predetermined number of product packages have been removed in less than a predetermined amount of time, the microcomputer may determine that a potential theft situation is in progress. Another condition that may be communicated is a low product condition. For example, the microcomputer may determine a low product condition if any pusher location is empty of product packages or less than a predetermined number of product packages are still being urged by the pusher 1025.

As illustrated in FIGS. 15*a* and 15*b*, without departing from the present invention, the shelf management system 1000 may include a local audio annunciator 1050. Any of the conditions described above may be communicated by the microcomputer via wired or wireless means to various communication modules, such as: a local or remote audio annunciator 1050, a local or remote light annunciator 1060, a remote computer, a store public announcement system, a cell phone, a pager, or an other remote annunciator. An internal wireless capability of the control module 1040 may wirelessly transmit signals to/from a remote location to indicate the condition of the shelf management system.

Figure 16A:
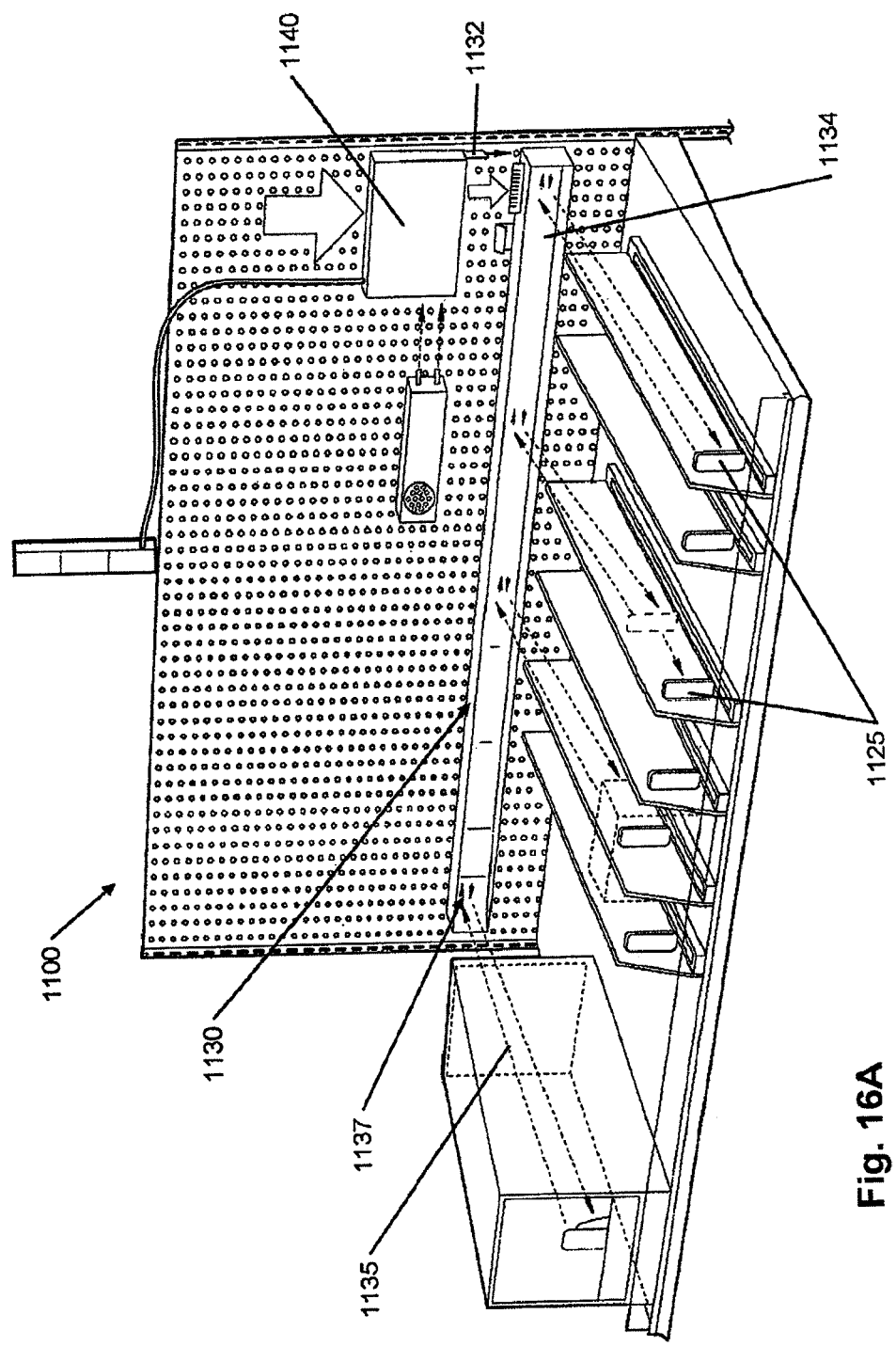
FIG. 16a illustrates an isometric view of yet another alternative embodiment of the present invention.
Figure 16B:
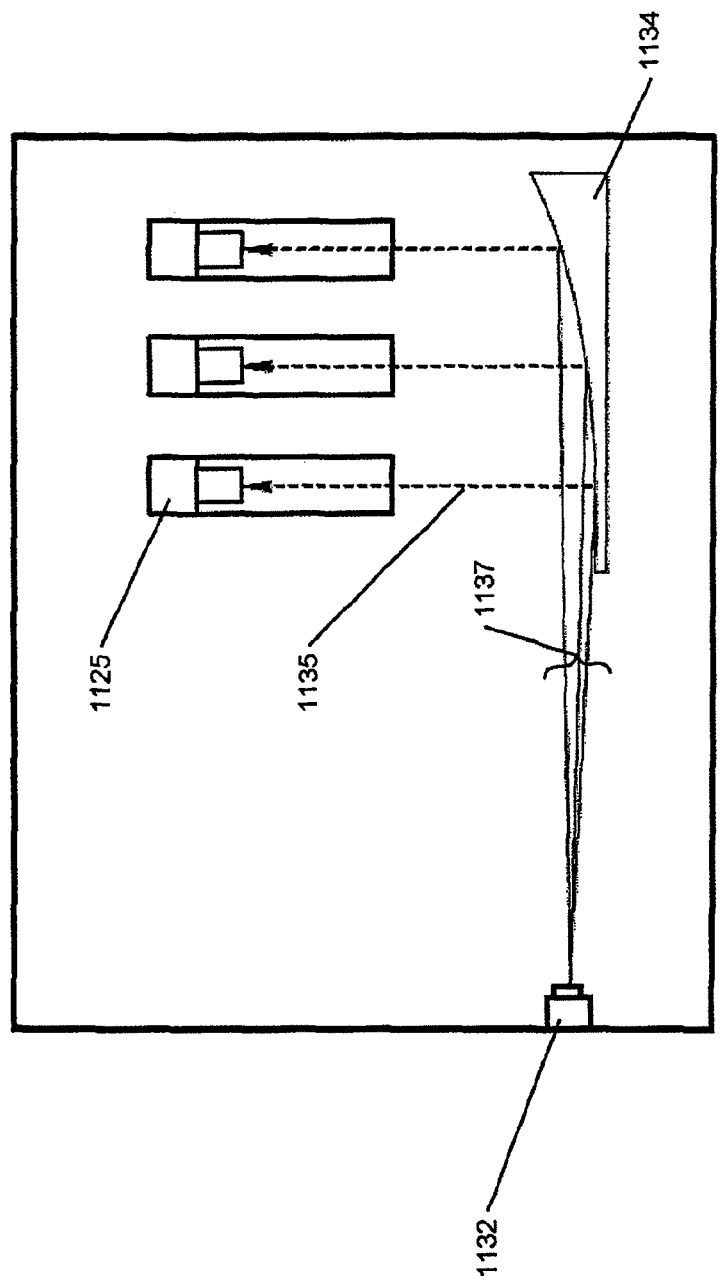

In another embodiment similar to the embodiments described above, as illustrated in in FIGS. 16*a* and 16*b*, a shelf management system 1100 may include one fixed mirror 1134 located along the length of the rear reflector strip 1130. In this embodiment, and as illustrated in FIGS. 16*a* and 16*b*, the shape of the fixed mirror 1134 may be curved and may be approximately a parabola shape. Since the laser scanner 1132, the moving mirror, and ultimately the swept beam 1137, are controlled by the microcomputer or control module 1140, the microcomputer is capable of determining the position of each pusher 1125 on the shelf by knowing and using the position of the moving mirror at any point in time during the sweeping motion and analyzing the output beam 1135. Additionally, the process of transmitting the swept beam 1137 from the laser scanner 1132 to and from the pusher paddle 1125 may be taken on a continuous or near continuous basis, such as a fraction of a second, or on a periodic bases such as a second, or every 5 seconds.

Additionally, the microcomputer may execute an algorithm which determines that multiple readings represent only one wide pusher 1125. This might be the case if readings are taken every 1 inch along the length of an example 48 inch-long shelf. A product position 1110 in front of a pusher 1125 on the shelf may be six inches wide. Therefore, in this example, five or six readings may be taken across the back of the pusher 1125 and product as the mirror sweeps and directs the swept beam 1137. If one of the six-inch wide products is removed from the pusher 1125, the microcomputer detects that at least five or six sensing positions essentially simultaneously changed an equal amount. The microcomputer may then be able to determine that all five or six readings represent one product width. This can be a learned aspect of the shelf management system 1100 which can change as different products are merchandised on the shelf over time.

Figure 17A:
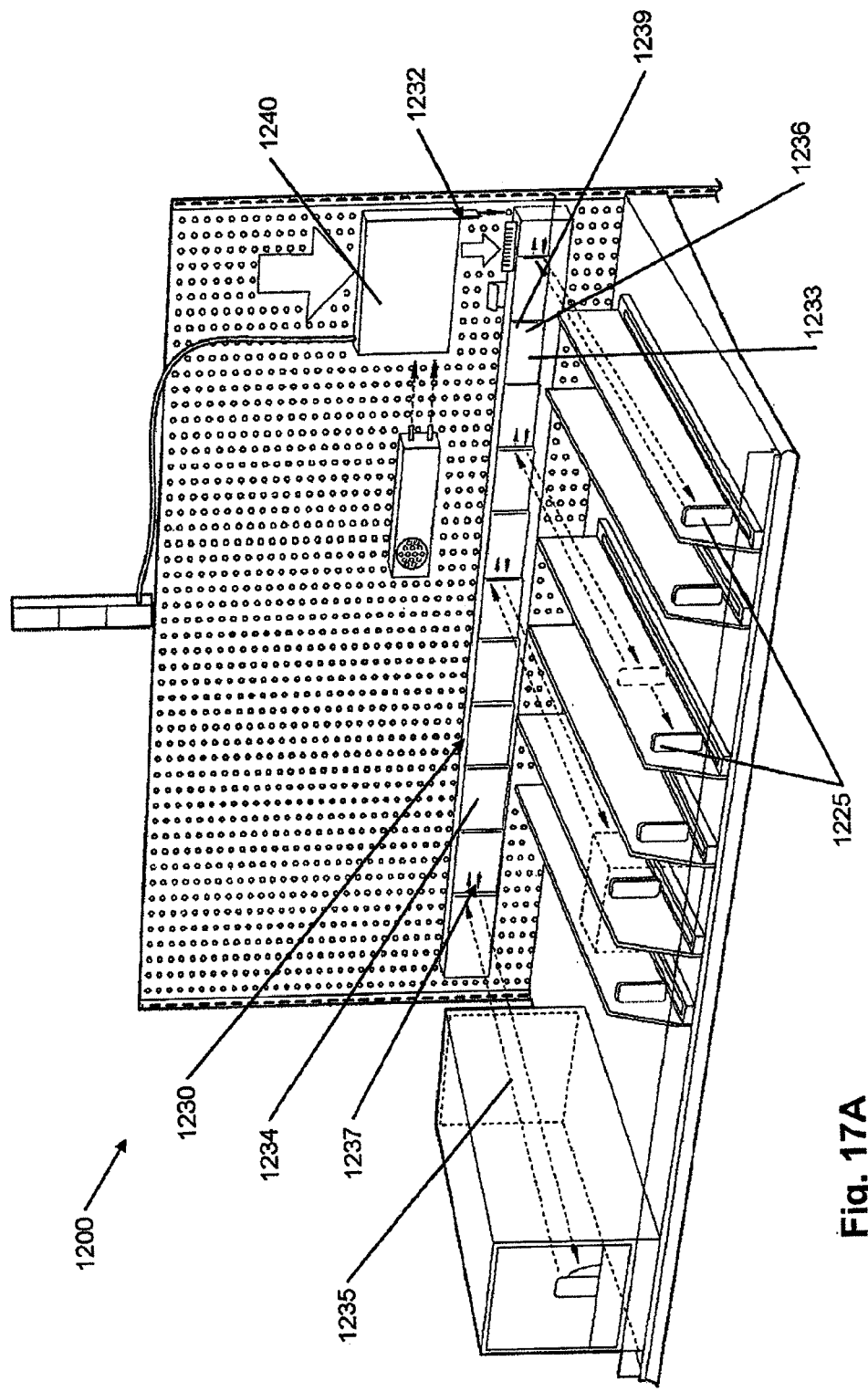
FIG. 17a illustrates an isometric view of yet another alternative embodiment of the present invention.
Figure 17B:
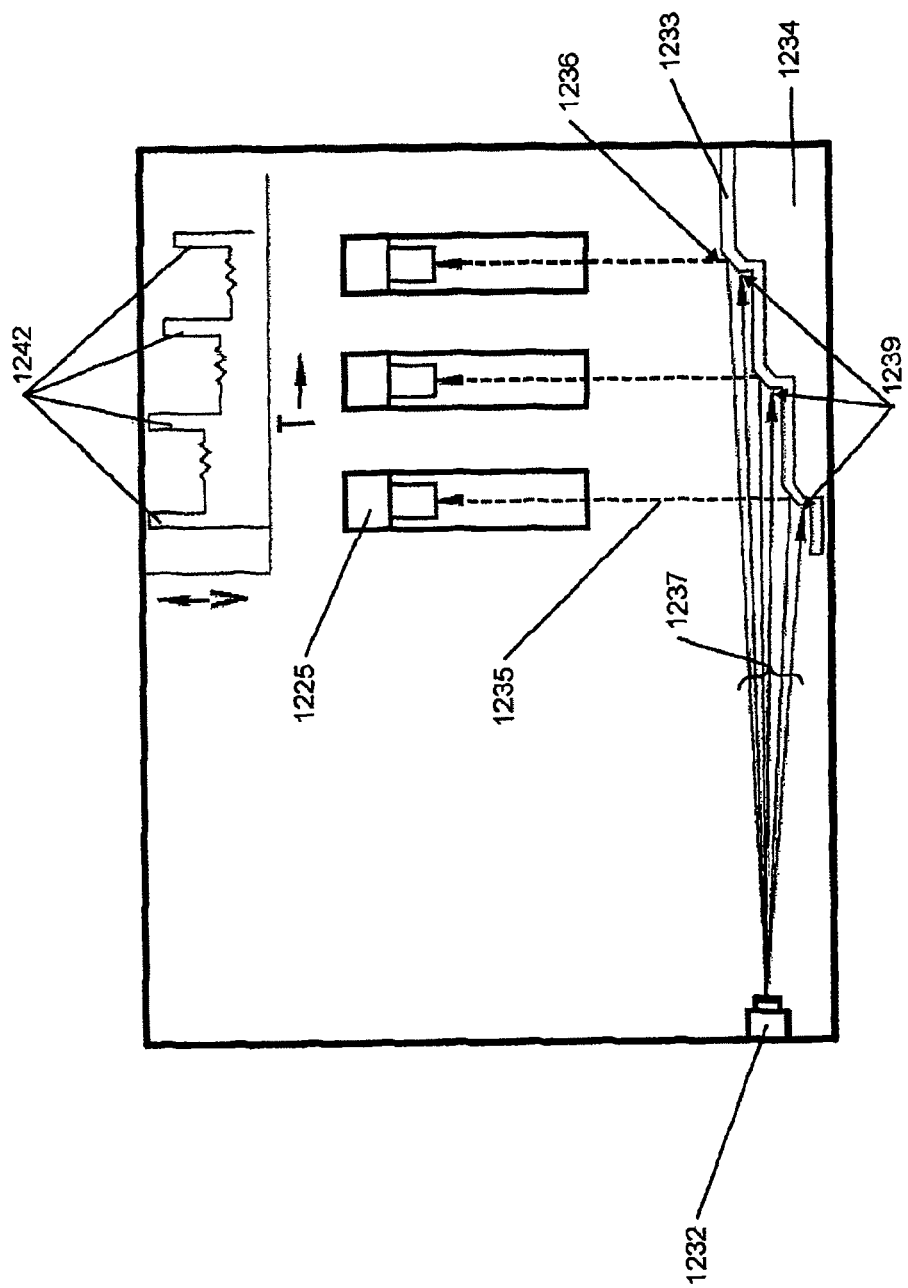

In another embodiment similar to the embodiments described above, as illustrated in FIGS. 17a and 17b, a parabolic piece-wise linear mirror 1234 with a piece-wise linear approximation of a parabola may be utilized. As illustrated in FIGS. 17a and 17b, a shelf management system 1200 may include a piece-wise parabolic mirror 1234 that may be positioned along the rear reflector strip 1230. This piece-wise parabolic mirror 1234 may include multiple linear sections 1233 with multiple leading edges 1236. The linear sections 1233 may be wide enough to be easily manufacturable. Additionally, the linear sections 1233 may be narrow enough so that a shelf filled with the narrowest pushers 1225 will have at least one linear mirror section 1233 reflecting the output beam 1235 to/from it. As illustrated in FIGS. 17a and 17b, the leading edge 1236 of each linear mirror section 1233 may include a small flat section 1239 and an angled leading edge 1236. The small flat section 1239 may retro-reflect the swept beam 1237 directly back to the laser scanner 1232, without first allowing it to reflect from the back of a pusher 1225. The process of transmitting the swept beam 1137 from the laser scanner 1132 to and from the pusher paddle 1125 may be taken on a continuous or near continuous basis, such as a fraction of a second, or a periodic basis such as a second, or 5 seconds.

For example, as specifically illustrated in FIG. 17b, as the beam 1237 sweeps, the laser scanner 1232 will see a series of short bright bursts directed back to the laser scanner 1232, followed by a reflection from the angled leading edge 1236. The reflection from the angled leading edge 1236 indicates the position of a pusher 1225. As the moving mirror sweeps the beam beyond the edge of the first linear section, the mirror will again encounter a small flat section 1239 preceding the second angled leading edge 1236. These small flat sections 1239 may represent cue points on the piece-wise parabolic mirror 1234. These cue points 1239 may be interpreted by the microcomputer as 'cue' signals 1242. Additionally, these small flat sections 1239 may divide the shelf up into designated sections that can be analyzed by the microcomputer for movement. Based on the distance and location of the small flat sections 1239, the laser scanner 1232 may alert the control module 1240 that an angled leading edge 1236 is about to be encountered and a reading should be taken. In this way, the control module 1240 does not need to have a fine level of measurement of the moving mirror position. Additionally, the length of the piece-wise parabolic mirror 1234 can be any length. The control module 1240 may determine the number of pusher positions to read based on the number of cueing signals 1244 it receives between the 'home' and 'end' positions of the swept beam 1237.

Additionally, for the shelf system illustrated in FIGS. 15a-17b, the number of products aligned on the shelf could be measured. In such an embodiment, the position of the pusher could be used to determine the amount of product on the shelf without the need to manually count the product. For example, the laser scanner sends the output beam to the pusher or the product. The output beam may then be reflected back to the laser scanner to determine the location of the pusher by measuring and calculating the time to receive the output beam at the laser scanner. When one product is removed, for example by a purchaser, the time to receive the output beam back at the laser scanner may increase a set amount. Based on the dimensions of the product, specifically the thickness of the product, the control module can calculate how many products have been removed from the shelf by an algorithm of how fast the output beam is traveling back to the laser scanner. Without departing from this invention, the thickness of the product may be a setting or input that can be input into the control module during the set-up of the product on the shelf. Additionally, without departing from this invention, the thickness of the product may be determined by the control module after taking a number of different readings from the system, such as a smart or learning system for determining the thickness of the product.

The advantage of the invention illustrated in FIGS. 14-17b is evident in several ways. First, the present invention has no connection to the spring-urged pusher system and hence can work with almost any system currently in use. Second, the present invention has no physical moving connection to the pusher system or the product which precludes the system from wearing out or getting dirty and reducing its effectiveness over time or with the number of products sold. Third, the present invention can operate from batteries for an extended period of time. RFID inventory systems require relatively high power radio-frequency transmitters to scan the product on the shelf and cannot operate from batteries. Fourth, the cost of the system may be amortized over the number of products sold from the shelf over a number of years. This cost of the system is as opposed to having to justify the cost of an individual RFID tag on each product package as well as amortizing an expensive reader system and infrastructure in each product's price. Lastly, the present invention can be programmed to ignore the replacement of product back onto the shelf as is the case when the shelf is being restocked.

The sensors of the various sensing configurations discussed in the above embodiments may output a signal representing the sensed parameter in either analog or digital format. The analog output may in the form of a voltage or current signal. As one skilled in the art will realize, an analog-to-digital converter may be utilized to transform the analog signal to a digital signal for use by a controller or processing device.

Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A system for detecting and communicating a position of a pusher on a shelf comprising:
    a pusher assembly that comprises:
        a divider wall,
        a first floor section on one side of the divider wall,
        a second floor section on a second side of the divider wall, and
        a pusher,
        wherein the first floor section includes a pusher track comprising:
            a first rail,
            a second rail, and
            an elongated aperture between the first rail and the second rail, a signal transmitter mounted to the pusher, the signal transmitter configured to transmit a signal, a receiver configured to receive the signal transmitted from the signal transmitter, wherein the receiver is positioned at a stationary location in relation to the pusher; and a processing device that is configured to receive data regarding the signal and configured to determine a movement of the pusher and a rate of change in a product level and further configured to provide notification when a deviation in a typical movement of the pusher and the rate of change of the product level has occurred.

2. The system of claim 1, wherein the receiver is located at a remote location from the shelf.

3. The system of claim 2, wherein the remote location is above the shelf.

4. The system of claim 1, wherein the signal is an infrared signal.

5. The system of claim 1, wherein the signal is a radio frequency signal.

6. A system for detecting and communicating a position of a pusher that biases product on a shelf toward a front of the shelf, the system comprising:

a signal transmitter mounted to a pusher, the signal transmitter having a unique identifying code, wherein the signal transmitter is configured to communicate a signal that includes the unique identifying code, a receiver that is located remote from the signal transmitter and configured to receive the signal communicated by the signal transmitter, a processing device that is configured to receive information related to the signal communicated by the signal transmitter and is configured to determine a level of a product.

7. The system of claim 6, wherein the receiver is located above the shelf.

8. The system of claim 6, wherein the signal transmitter is a signal transponder.

9. The system of claim 8, wherein the signal transponder is a radio frequency signal transponder.

10. The system of claim 6, wherein the processing device is further configured to determine a movement of the pusher and a change in a product level.

11. The system of claim 6, wherein the processing device is further configured to transmit a signal regarding the level of the product.

12. The system of claim 6, wherein the processing device is further configured to compare information related to the signal to previous information received from the signal transmitter.

13. The system of claim 12, wherein the processing device is further configured to provide notification when a deviation in a typical movement of the pusher and a rate of change of the product level has occurred.

14. A system for detecting and communicating a position of a pusher on a shelf comprising:

a pusher assembly that comprises:

a pusher, wherein a signal transmitter is mounted on the pusher, the signal transmitter configured to transmit a signal, a floor section including a pusher track comprising a first rail, a second rail, and an elongated aperture between the first rail and the second rail, a receiver configured to receive the signal transmitted from the signal transmitter, wherein the receiver is positioned at a stationary location in relation to the pusher; and a processing device configured to receive data regarding the signal and to determine a movement of the pusher and a rate of change in a product level and further configured to provide notification when a deviation in a typical movement of the pusher and the rate of change of the product level has occurred.

15. The system of claim 14, wherein the receiver is located on the floor.

16. The system of claim 14, wherein the receiver is located on a divider wall adjacent the floor section.

17. The system of claim 14, wherein the receiver is located at a remote location from the shelf.

18. The system of claim 17, wherein the remote location is above the shelf.

19. The system of claim 14, wherein the receiver is configured to transmit an activation signal to the signal transmitter.

20. The system of claim 14, wherein the signal includes a unique identifying code.

* * * * *